(12) United States Patent
McDuffie et al.

(10) Patent No.: US 7,677,158 B2
(45) Date of Patent: Mar. 16, 2010

(54) BEVERAGE MAKER HAVING BREWING CHAMBER ADAPTED TO RECEIVE COFFEE PODS OR LOOSE COFFEE

(75) Inventors: Richard McDuffie, Worcester, MA (US); Edward Jones, Stratford, CT (US); Peng Chao, XiangYin (CN); Jun Li Guo, TaiYuan (CN); Sek Biu Leung, Tsuen Wan (HK); Roy E. Whitson, Franklin, NH (US); Alan K. Stratton, Milford, NH (US); Brian R. D'Amelio, Auburn, NH (US)

(73) Assignee: Sunbeam Products, Inc., Boca Raton, FL (US)

( * ) Notice: Subject to any disclaimer, the term of this patent is extended or adjusted under 35 U.S.C. 154(b) by 1168 days.

(21) Appl. No.: 11/266,568

(22) Filed: Nov. 3, 2005

(65) Prior Publication Data

US 2006/0090653 A1 May 4, 2006

Related U.S. Application Data

(60) Provisional application No. 60/624,569, filed on Nov. 3, 2004, provisional application No. 60/671,279, filed on Apr. 14, 2005.

(51) Int. Cl.
*A47J 31/00* (2006.01)
(52) U.S. Cl. .................. 99/302 R; 99/295; 99/289 R
(58) Field of Classification Search ............... 99/302 R, 99/295, 307, 289 R
See application file for complete search history.

(56) References Cited

U.S. PATENT DOCUMENTS

| 5,343,799 | A | 9/1994 | Fond |
| 5,398,596 | A | 3/1995 | Fond |
| 5,649,472 | A | 7/1997 | Fond et al. |
| 5,762,987 | A | 6/1998 | Fond et al. |
| 5,794,519 | A | 8/1998 | Fischer |
| 5,826,492 | A | 10/1998 | Fond et al. |
| 5,921,168 | A * | 7/1999 | Nello ........................ 99/295 |
| 6,009,792 | A | 1/2000 | Kraan |
| 6,490,966 | B2 | 12/2002 | Mariller et al. |
| 6,698,332 | B2 | 3/2004 | Kollep et al. |
| 6,748,850 | B1 | 6/2004 | Kraan |
| 6,892,627 | B2 | 5/2005 | Lalanne-Eygun |
| 6,935,222 | B2 | 8/2005 | Chen et al. |
| 6,971,304 | B1 * | 12/2005 | Lin ............................ 99/295 |
| 6,990,891 | B2 * | 1/2006 | Tebo, Jr. .................... 99/295 |
| 6,994,015 | B2 * | 2/2006 | Bruinsma ................ 99/289 R |
| 7,131,369 | B2 * | 11/2006 | Gantt et al. ............. 99/289 R |
| 7,503,254 | B2 * | 3/2009 | Noordhuis .................. 99/295 |
| 2004/0211322 | A1 | 10/2004 | Halliday et al. |

(Continued)

FOREIGN PATENT DOCUMENTS

EP 1 566 127 A2 8/2005

(Continued)

*Primary Examiner*—Reginald L Alexander
(74) *Attorney, Agent, or Firm*—Seth M. Blum

(57) ABSTRACT

A beverage maker is provided that allows a user to make a brewed beverage or dispense hot water. Various sealing and latching mechanisms are further provided for effectively sealing the brewing chamber under pressure. A mechanism is provided for reducing splashing when relatively short vessels are positioned beneath the brewing chamber.

10 Claims, 30 Drawing Sheets

U.S. PATENT DOCUMENTS

| | | |
|---|---|---|
| 2004/0231523 A1 | 11/2004 | Kraan |
| 2004/0244599 A1 | 12/2004 | Wei |
| 2005/0005775 A1 | 1/2005 | Chen et al. |
| 2005/0076789 A1 | 4/2005 | Tebo, Jr. |
| 2005/0098043 A1 | 5/2005 | Bruinsma |
| 2005/0172821 A1 | 8/2005 | Chen et al. |
| 2005/0188854 A1 | 9/2005 | Green et al. |
| 2006/0048650 A1 | 3/2006 | Laigneau et al. |

FOREIGN PATENT DOCUMENTS

| | | |
|---|---|---|
| WO | WO 2005/087066 A1 | 3/2005 |
| WO | WO 2005/087066 A1 | 3/2005 |

* cited by examiner

BEVERAGE MAKER HAVING BREWING CHAMBER ADAPTED TO RECEIVE COFFEE PODS OR LOOSE COFFEE

CROSS REFERENCE TO RELATED APPLICATION

This application claims priority of U.S. Ser. No. 60/624,569 filed Nov. 3, 2004 and Ser. No. 60/671,279 filed Apr. 14, 2005, both of which are incorporated by reference herein.

BACKGROUND OF THE INVENTION

1. Field of the Invention

The field of the invention relates to beverage makers adapted to receive coffee pods or loose coffee, and to brewing chambers for such coffee machines and other beverage makers. It further relates to methods for brewing coffee or other beverages in a pressurized brewing chamber including brewing single cups and carafes using the same basic system. The field of the invention additionally relates to coffee makers adapted to deliver hot water on demand using the same heater as that used to make coffee. The hot water is preferably delivered through a separate water channel independent of the coffee channel.

2. Brief Description of the Related Art

A variety of coffee makers have been designed for use in the home and/or in commercial establishments. Some types of coffee makers employ pumps for delivering hot water to a brewing chamber. The water can be heated in a reservoir or in a heater connected in the fluid line between the reservoir and the brewing chamber. Water is provided under pressure to the brewing chamber, where it is caused to pass through ground coffee or other flavoring material and into a receptacle. The pressure maintained in the brewing chamber varies among coffee makers. Relatively high pressure is required to properly brew certain beverages such as espresso while relatively low pressure can be used to brew tea or coffee. Brewing chambers that operate under pressure must be sealed in order to function properly. A number of different arrangements have been employed to lock and seal such chambers. Access to the brewing chamber can be provided by a cover or lid hingedly attached to the coffee maker housing.

Many coffee makers are designed to accept coffee pods. Coffee pods are generally made from a porous cellulose enclosure filled with coffee grounds. As pods contain a specific amount of coffee grounds, a person can make a cup of coffee that is both fresh and is of desired strength.

SUMMARY OF THE INVENTION

The invention relates to a hot beverage maker including a number of features that provide improved performance and versatility. In accordance with a first embodiment of the invention, a hot beverage maker is provided that includes a reservoir for holding water, a brewing chamber having an outlet for brewed beverages, a water outlet separate from the beverage outlet, a pump for drawing water from the reservoir, a heater for heating water drawn from the reservoir, a first fluid line connected to the brewing chamber, a second fluid line connected to the water outlet, and a valve for selecting whether heated water flows through the first or second fluid lines. The user can accordingly obtain hot water from the beverage maker without imparting a coffee taste from hot water exiting the water outlet. The beverage outlet is preferably adjacent to the water outlet so that a carafe or cup can be placed in the same position beneath the brewing chamber regardless of whether hot water or a brewed beverage is being dispensed.

In accordance with a further embodiment of the invention, a sealing assembly is provided for effectively sealing the brewing chamber as water is pumped under pressure therethrough. A housing is provided for the brewing chamber and a cover is positionable on the housing for closing the brewing chamber. The beverage maker further includes a water reservoir, a pump in fluid communication with the water reservoir and a water inlet, and a heater for heating water prior to its entering the water inlet. A sealing assembly is movably mounted to the cover such that it is movable between up and down positions with respect to the cover. The sealing assembly includes a side surface and an O-ring seal mounted in adjoining relation to the side surface. The O-ring seal is in substantially a horizontal position when the cover closes the brewing chamber. Horizontal forces are accordingly exerted on the O-ring seal when the sealing assembly is moved to the sealing position. A latching assembly is further provided for latching the cover to the housing for the brewing chamber.

In accordance with an alternative embodiment of the invention, a different mechanism is provided for closing and sealing the brewing chamber. A hot beverage maker in accordance with this embodiment includes a housing for a brewing chamber and a cover assembly positionable on the housing for closing the brewing chamber. The cover assembly includes a sealing assembly. A water inlet is provided in the cover assembly. The beverage maker further includes a water reservoir and a pump in fluid communication with the water reservoir and the water inlet. A heater is provided for heating water prior to its entering the water inlet. A hook is pivotably mounted to the cover assembly. A hook engagement member is mounted to the housing for the brewing chamber. The hook engagement member is positioned and configured to allow at least a portion of the hook to extend beneath and engage a lower surface of the hook engagement member. The sealing assembly can accordingly be drawn towards the brewing chamber housing as the hook is pivoted by the user, providing an effective seal between the cover assembly and the brewing chamber housing.

In accordance with a further embodiment of the invention, a hot beverage maker is provided that facilitates the use of vessels of various heights. Specifically, the beverage maker is adapted to reduce splashing when a relatively short vessel is employed to receive a brewed beverage beneath the brewing chamber. In accordance with this object, a beverage maker is provided that includes a first housing and a second housing mounted to the first housing and containing a brewing chamber having a bottom outlet for dispensing a brewed beverage. A spout is mounted to the first housing and is movable between a first position where it is not vertically aligned with the bottom outlet and a second position where the spout is vertically aligned with the bottom outlet. In the first position, the spout serves no function and a relatively tall vessel such as a carafe can be positioned under the bottom outlet. When a shorter vessel such as a cup is to be filled, the spout is moved to the second position where a brewed beverage exiting the bottom outlet will first engage the spout prior to entering the cup. Such an arrangement can significantly reduce splashing. In accordance with a preferred embodiment, the first housing includes a carafe support beneath the brewing chamber that is adjustable in height. The support would be positioned at a relatively high setting when a short vessel is positioned under the brewing chamber outlet. The support can be adjusted to provide a lower support surface when a taller vessel is positioned beneath the brewing chamber.

DETAILED DESCRIPTION OF THE PREFERRED EMBODIMENTS

Figure 1:
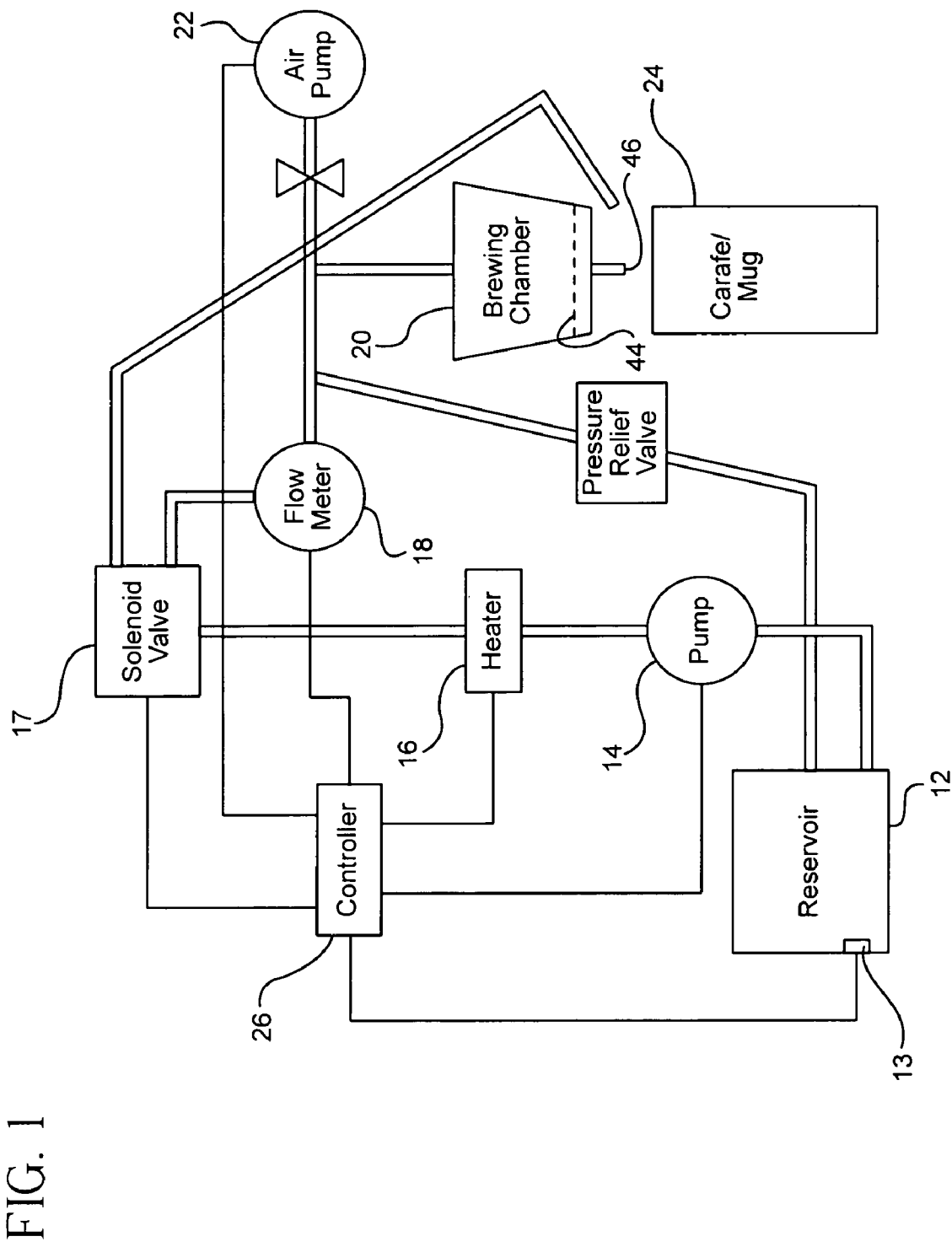
FIG. 1 is a schematic diagram of a coffee maker in accordance with a first embodiment of the invention.

FIG. 1 schematically illustrates the basic components of a coffee maker in accordance with a first embodiment of the invention.

The proposed coffee maker employs a cold water reservoir 12 that is connected by a water pump 14 to a continuous heater 16. Hot water flows through a solenoid valve 17, then through a flow meter 18 to a brewing chamber 20 under back pressure. Pressure of about 2-4 psi and preferably about 3 psi is developed in the brewing chamber, though the actual pressure developed will depend on various factors as described below. An air pump 22 is provided for purging the brewing chamber of residual coffee once the brewing cycle has been completed. The line from the air pump is connected to the line leading to the brewing chamber and includes a one way valve that is closed while the water pump is operated. The brewing chamber is adapted to accept a relatively large volume of ground coffee or a relatively small volume in either the form of loose ground coffee or a coffee pod. This allows the coffee maker to produce anywhere between a single cup and an 8-12 cup carafe of coffee. The carafe is preferably a thermal carafe that retains heat. Accordingly, the coffee maker does not require a warming plate. It will be appreciated that the coffee maker could be adapted to be used with glass carafes, in which case a warming plate could be provided. A vessel 24 such as a carafe, cup or mug is positioned beneath the exit opening of the brewing chamber.

The water heater 16 employed in this embodiment is comprised of a solid mass of aluminum with an extruded tube running through the middle. It has embedded CALROD heating elements on each side of the tube. It will be appreciated that other conventional in-line, on demand heating units could be employed.

The water pump is actuated after the actuation of the water heater 16 when the coffee maker is turned on. This allows the water in the heater to reach about 190-210 degrees F. before it flows toward the brewing chamber. Actuation can be caused by a thermostat or other sensor detecting a proper temperature at the heater or simply using a time delay between actuation of the heater and actuation of the pump. A time delay is preferred. The water pump preferably operates at one speed. The voltage of the heater is preferably not changed as the coffee maker operates. The pump rate and heating capacity of the heater are matched so that water between 190-210 F is provided to the brewing chamber. The heater is shut off prior to deactuation of the water pump. A signal is provided from the flow meter 18 to a controller 26 indicating that most of the water necessary to brew the selected amount of coffee has been pumped (e.g. 80-90%). The controller then causes the heater to be shut off while the pump continues to pump the remaining amount of water necessary to brew the selected volume of coffee. The heater will still be hot while water passes through it near the end of the brewing cycle. This helps ensure that the heater will not run dry while heat is still being generated. An object is to avoid generating steam at the end of the brewing cycle. As a safety measure, the heater will also be shut off if temperatures exceed a given level or if the flow meter indicates that insufficient water is being pumped. Accordingly, if a user has not added sufficient water to the reservoir 12 to brew the selected amount of coffee, the heater will shut down when the insufficiency of water is indicated by the flow meter, which stops spinning at an expected rate. It will also shut down if a low water sensor 13 in the reservoir 12 is triggered. The water heater accordingly should not run out of water and overheat.

The proposed coffee maker includes a temperature sensor in the form of a thermistor (not shown) in the water line exiting the water heater. If the temperature exceeds a given level, a signal is sent to the controller 26 and the heater is shut off. The heater is again activated when the temperature drops below the given level, assuming the coffee maker is still in the brewing mode. As a separate safety feature, a TCO is provided that includes a thermostat for sensing the temperature of the heater itself. The heater is shut off if the temperature of the heater exceeds a safe operating temperature. Thermal cut-offs (TCO's) are commonly used on electric appliances. A wax fuse (not shown) is also provided as a further safety feature for the water heater.

Figure 2:
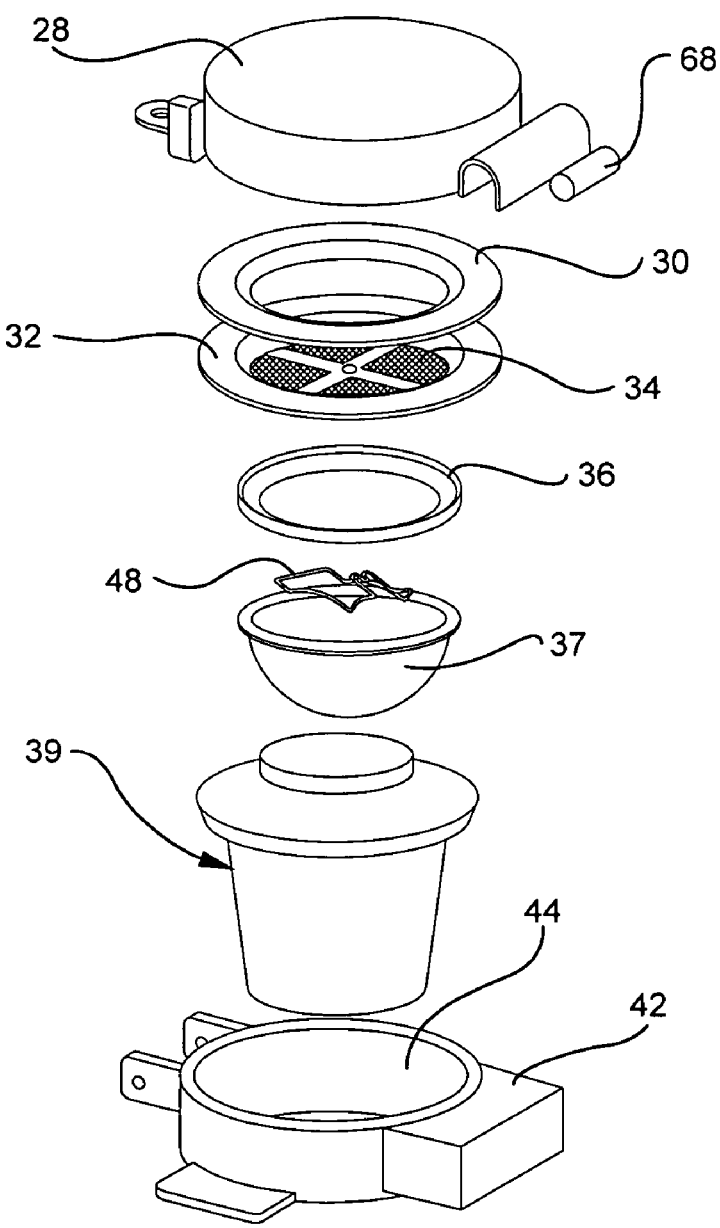
FIG. 2 is an exploded, perspective view of a brewing chamber and associated components for a coffee maker.

FIG. 2 is an exploded, perspective view of the brewing chamber assembly of the first embodiment of the invention. The brewing chamber would be incorporated within a coffee maker housing such as shown in FIG. 4. The reservoir 12, pumps 14, 22, controller 26, and flow meter 18 would also be incorporated on or within the housing.

As discussed above, a pressure of about 2-4 psi is expected to be developed in the brewing chamber as coffee is brewed. The elements of the brewing chamber as well as the pump are designed so that the desired pressure can be maintained. Referring to FIG. 2, the brewing chamber assembly includes a cover 28, a first silicone seal 30, a water diffuser 32 including a molded screen 34, a second silicone seal 36, a single serving insert 37, a carafe filter insert 39 with molded in filter screen defining a main brewing chamber, and a support 42 for the carafe filter insert 39.

The cover 28 includes an inlet (not shown) for receiving water during the brewing cycle or air at the time the brewing chamber is purged of residual liquid. The diffuser 32 is mounted to the cover and is movable therewith when the cover is opened or closed. The peripheral edge of the diffuser is enveloped by the first silicone seal 30. The upper portion of the first silicone seal accordingly provides a seal between the cover and the diffuser. The carafe filter insert 39 includes an annular shoulder adjoining the top opening thereof. When the cover 28 is closed, the bottom portion of the first silicone seal 30 is in sealing engagement with the annular shoulder and the diffuser 32.

The single serve insert 37 includes an upper lip to which the second silicone seal 36 is mounted. The carafe filter insert 39 includes a shoulder for engaging the bottom portion of the second seal. The diffuser includes an annular shoulder (not shown) formed on its lower surface that engages the top portion of the second seal when the cover is closed.

Pressure is maintained in the brewing chamber during the brewing cycle as the elements discussed above are effectively sealed once the cover is closed and the filter screens in the diffuser, the carafe filter insert and the single serving insert (if used) are sized to permit only a limited pressure drop. Use of the insert is not required to develop acceptable pressure within the brewing chamber when a carafe of coffee is to be brewed. The size of the bottom openings of the carafe filter and pod inserts will also affect the pressure within the brewing chamber.

As the amount and type of coffee to be brewed also affect the pressure in the brewing chamber, the screen openings and exit opening are matched such that pressure is maintained in an acceptable range, i.e. about 2-4 psi, under normally expected operating parameters. If, for example, the carafe filter insert is filled with the maximum amount of coffee, more pressure will be developed than if it was only half filled. Coffee may be ground relatively finely, which also tends to result in more pressure than coarser grinds. Different screen mesh sizes may be used depending on the size and configuration of the brewing chamber. More or less screen material may be used, also depending on the size of the brewing chamber, to provide more or less screen area. There are accordingly a number of options available to one skilled in the art for ensuring that a desired brewing chamber pressure is obtained. The pump, of course, also plays an important role in creating pressure.

Figure 3:
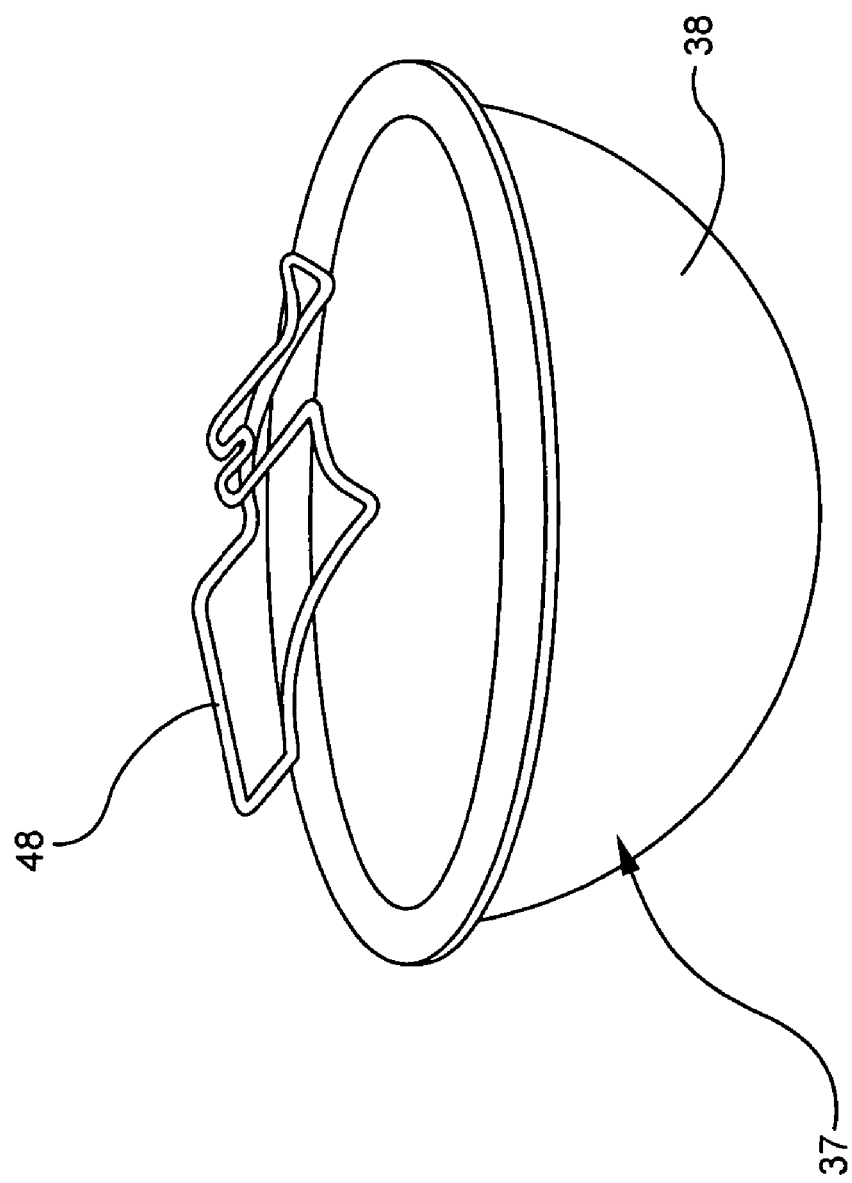
FIG. 3 is a top perspective view of a pod insert for a coffee maker.

The single serve insert 37 is preferably adapted for receiving a coffee pod as well as loose coffee. While loose coffee can be brewed successfully by simply pouring it in the cup-shaped insert and running the hot water through it, a coffee pod may tend to float in the insert such that some water flows around it rather than through it. To address this possibility, a spring clip 48 is mounted to the single serve insert as shown in FIG. 3. A fastener (not shown) is provided to hold the clip in place on the insert 37. The spring clip urges the coffee pod (not shown) to maintain it against the filter screen portion 38 located at the bottom of the single serve insert. It will be appreciated that other types of clamping or retaining mechanisms can be employed in association with the single serve insert 37 to hold a coffee pod in place. It will also be appreciated that different thickness pods or multiple pods stacked on top of each other creating different thickness can be held down with this flexible spring clip.

When making a single cup of coffee, it is important to bring the brewing chamber up to normal operating pressure as soon as possible. To avoid having to pressurize the entire brewing chamber when only a single cup of coffee is to be brewed, the user would mount the single serving insert 37 near the top of the brewing chamber. The insert would be filled with coffee or a coffee pod would be placed in the insert. This, in effect, creates a smaller brewing chamber that will quickly reach the desired operating pressure once the pump 14 is actuated. If a full carafe is brewed, the insert would not be used and most of the volume of the brewing chamber would be taken up by ground coffee. The correct operating pressure would therefore still be reached in a reasonable time. The bottom portion of the brewing chamber assembly, comprised of the mesh screen 44, is supported above the exit opening 46 as shown in FIG. 1 so that the exit opening does not become clogged or restricted.

Figure 4B:
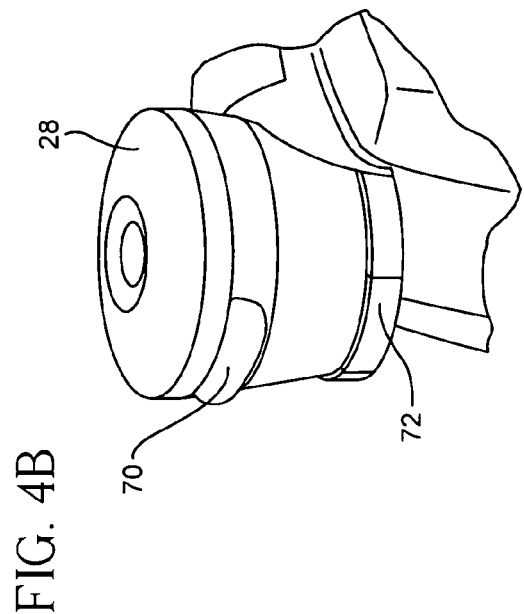
FIG. 4B is a top perspective view of a portion of the coffee maker shown in FIG. 4A showing a spout in the inactive position.
Figure 4C:
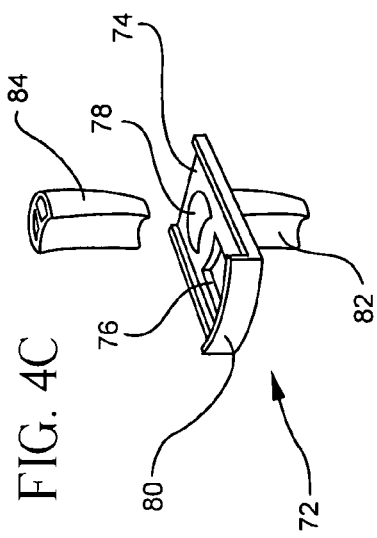
FIG. 4C is an exploded, perspective view of a retractable spout assembly for the coffee maker shown in FIG. 4A.
Figure 4A:
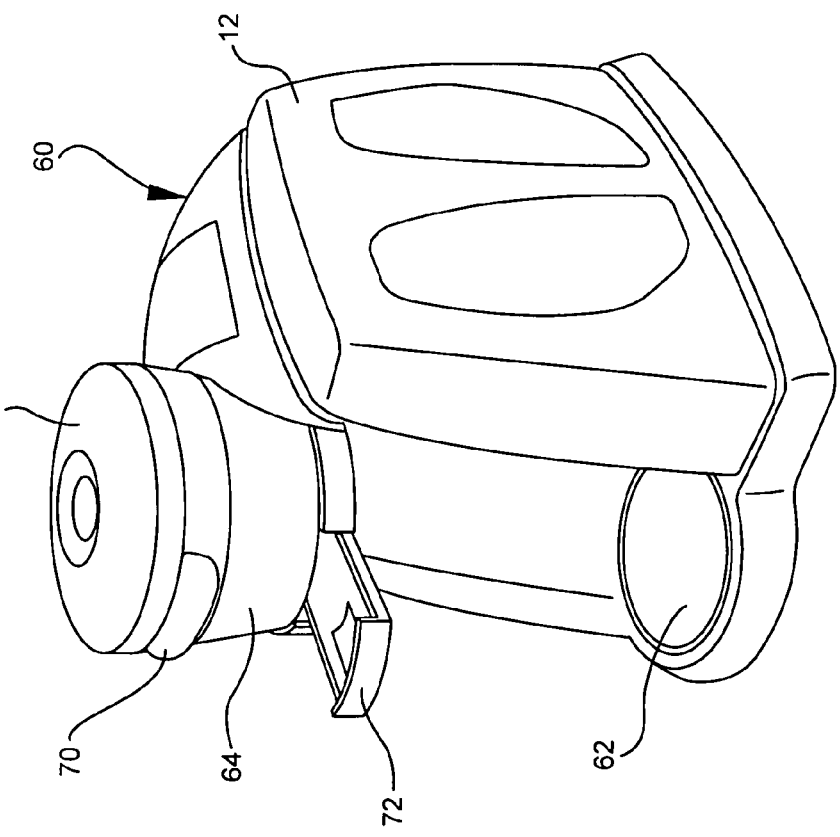
FIG. 4A is a top perspective view of a coffee maker in accordance with the invention.

Referring to FIGS. 4A-4C, a coffee maker 10 and portions thereof are shown that can employ the principles of the invention as described above or below. The coffee maker includes a main housing 60 adapted to contain the reservoir 12, water pump 14, heater 16, the solenoid valve 17 for diverting water after the heater, flow meter 18, air pump 22, controller 26 and associated conduits and electrical connections. A support 62 for a cup, mug or carafe is further provided. A secondary housing 64 contains the carafe filter insert 40 and associated components. The cover 28 is pivotably mounted to the secondary housing 64. (The same reference numeral is used to designate the covers in FIGS. 2 and 4 despite differences in cosmetic appearance.) A latch mechanism, several of which are described below, allows the cover to be locked on the secondary housing 64. A hinge assembly, part 68 of which is shown in FIG. 2, allows rotation of the cover when unlatched. An actuating button 70 or the like is provided for disengaging the latch.

The specific constructions of the hinge and latch assemblies are not considered critical to the successful operation of the coffee maker, and various types of known mechanisms could be employed in association with the cover to allow it to be opened, closed and locked. A number of preferred assemblies for locking and sealing the brewing chamber are described further below.

The secondary housing shown in FIG. 4A includes a pull tray 72 that may be moved between the positions shown in FIGS. 4A and 4B. The pull tray includes a horizontally extending, flat base portion 74 that is positioned immediately below the exit opening 46 of the brewing chamber 20. The base portion includes a relatively large opening 76 near its front end and a smaller opening 78 near the rear end thereof. A handle 80 is integral with the base portion for pulling or pushing the pull tray with respect to the secondary housing. A projection 82 forming an open duct or spout extends from the base portion beneath the smaller opening 78. (The terms duct and spout are used interchangeably and describe a structure for guiding a beverage from the outlet of the brewing chamber or a hot water outlet to a receiving vessel such as a cup or mug.) An insert 84 may optionally be removably supported by the base portion and extend through the smaller opening 78. The insert includes two channels running side by side, one for coffee and one for hot water. The pull tray 72 is fully inserted in the secondary housing, as shown in FIG. 4B, when a carafe or other tall vessel is positioned on the support 62. Coffee or hot water flows from the exit opening 46 through the slotted opening 76 and into the carafe. The tray 72 is pulled out to the open position shown in FIG. 4A when a small cup is on the support. The duct guides the coffee into the cup, thereby minimizing splashing that could otherwise occur if the coffee dropped directly from the exit opening 46 of the brewing chamber. The secondary housing 64 containing the carafe filter and associated components also contains a separate conduit channel, shown in FIG. 1, for the dispensing of hot water. This conduit or channel is provided to avoid mixing coffee material with "clean" water.

Once the coffee maker is turned on and the amount of coffee to be brewed is selected, its operation is controlled by the controller 26. As discussed above, the heater 16 is turned on prior to the pump to avoid pumping cold water into the brewing chamber. The thermal capacity of the heater and the pump rate are matched such that the water temperature is maintained within a desired range. The controller 26 in this preferred embodiment simply causes the heater and water pump to be turned on and off. It would, however, be possible to control the heat generated by the heater or the pumping rate in response to detected water temperature. Water continues to be heated and pumped to the brewing chamber 20 where it flows under pressure through the coffee and screens and into the vessel 24. The flow meter 18 provides signals to the controller representing the volume of water that has been pumped. The controller causes the heater to be deactivated once it determines that a selected percentage (e.g. 80-90%) of the selected amount of coffee has been brewed, which corresponds to the amount of water that has passed through the flow meter. The pump 14 is turned off by the controller when the selected amount of coffee has been brewed. Following the brewing cycle, the valve between the air pump and brewing chamber is opened (by the air pump coming on) and the air pump delivers a short burst of air. A one-way valve (not shown) may be provided between the flow meter 18 and brewing chamber to prevent air from moving through the flow meter towards the reservoir. The burst of air, which may last a few seconds, causes the residual liquids in the brewing chamber to be expelled into the vessel 24, thereby reducing or eliminating drip. A bypass line as shown in FIG. 1 including a pressure relief valve may be provided to the reservoir 12 from the line leading to the brewing chamber. Such a line would prevent excess pressure from being developed in the brewing chamber in the event of a blockage therein. To deliver the hot water (not coffee) on demand, the controller bypasses the flow meter readings and turns on the heater and pump. It also switches the flow in the solenoid valve 17 to dispense water out a specific opening. The switch in this case is momentary, and the user will be required to continue pressing a button or other actuating member (not shown) to maintain the flow of hot water. Once the switch is released, the heater and pump are shut off and the solenoid valve is returned to its "normal" flow configuration.

Figure 5:
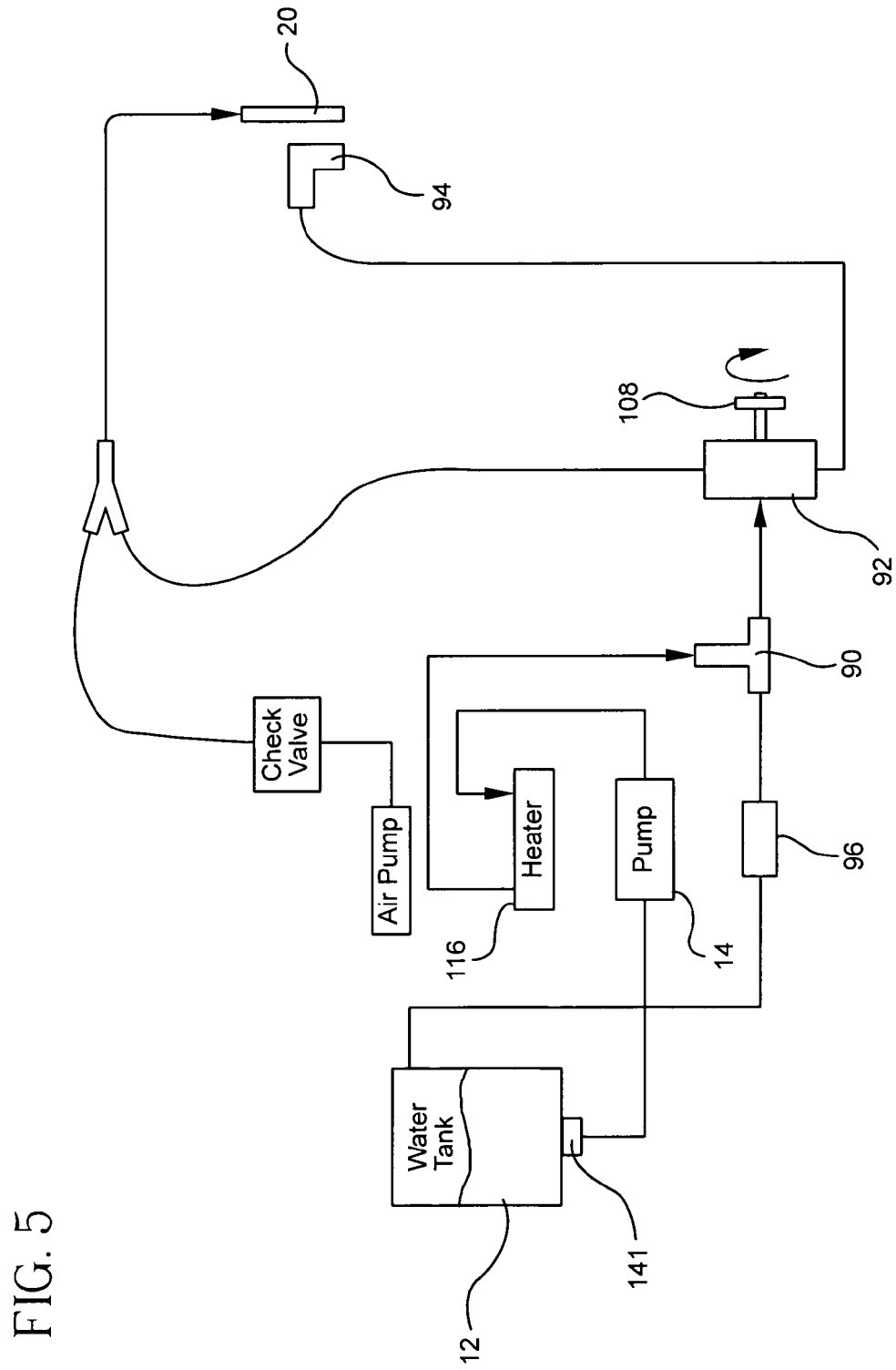
FIG. 5 is a schematic diagram of a coffee maker in accordance with a second embodiment of the invention.

FIG. 5 is a schematic illustration of the fluid flow paths (hot water, coffee, and air) of a preferred coffee maker. Where applicable, the same numerals used in FIG. 1 have been used to designate common elements. The electric water heater 116 is an on-demand water heater. As discussed above, the type of water heater employed is not critical so long as it is able to heat water quickly and to a consistent temperature. A "thick film" flow through heater is preferred. The heater 116 includes an inlet for receiving room temperature water from the reservoir 12. Hot water exiting the heater passes through a "T" fitting 90 and into a manually operable three way valve 92. Depending on the position of the valve, hot water then flows either to a hot water outlet 94 or to the brewing chamber 20. The "T" fitting is in fluid communication with the inlet of the three way valve 92, the heater outlet, and a check valve 96. The check valve, preferably rated at about ten psi, is in fluid communication with the top of the reservoir 12. This valve functions as a safety mechanism in the event that excessive pressure develops in the brewing chamber or elsewhere in the system.

While the air pump 22 shown in FIG. 5 is connected to a "Y" connector that also communicates with the brewing chamber 20 and one of the two outlets of the three-way valve 92, it is preferably located before or upstream of the three-way valve 92. This would allow the air pump to purge liquid not only from the coffee pod or grounds within the brewing chamber and the line leading to the brewing chamber, but also from the hot water line as well.

Figure 6:
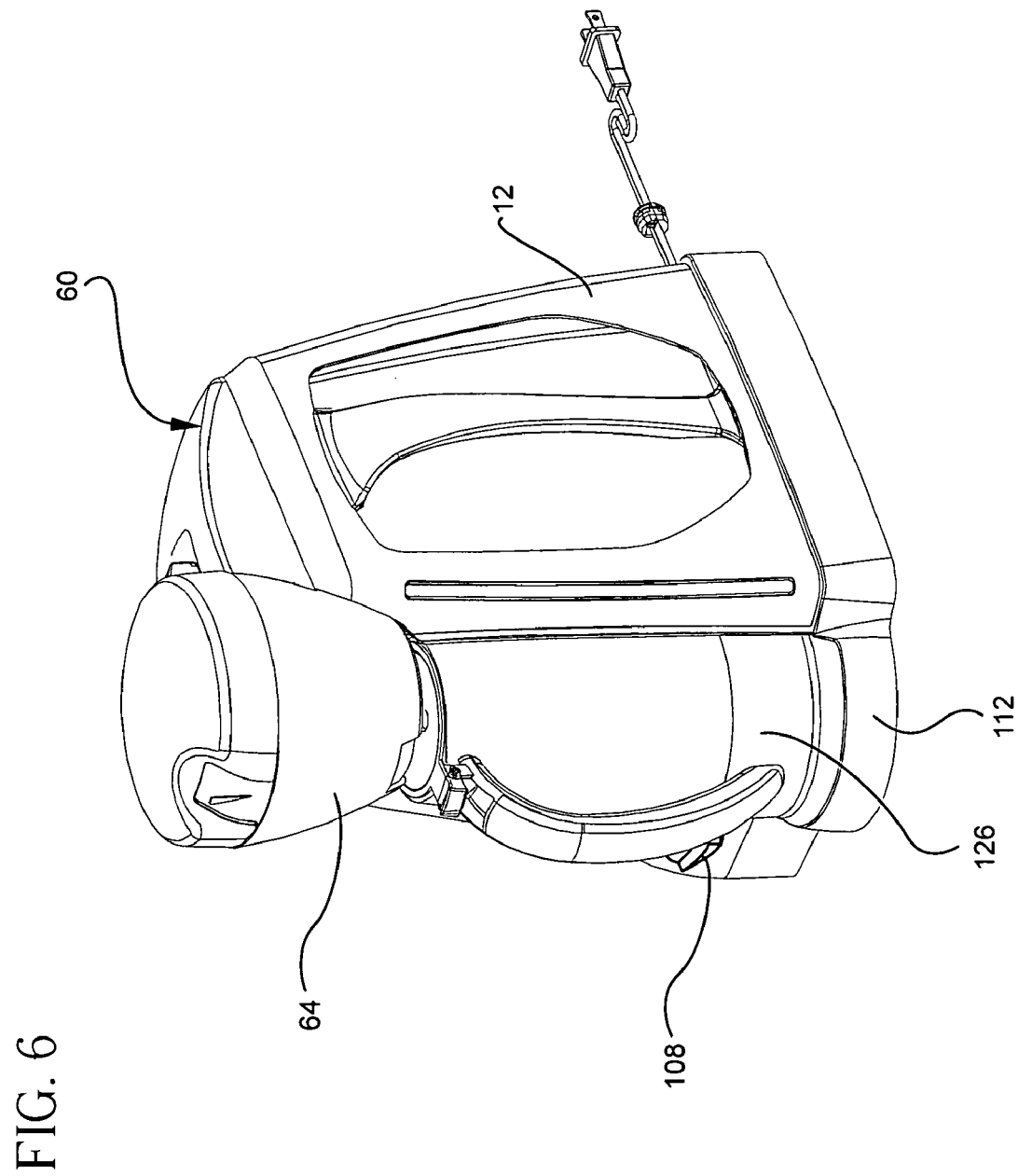
FIG. 6 is a top perspective view showing a coffee maker in accordance with a second embodiment of the invention with a carafe.
Figure 7:
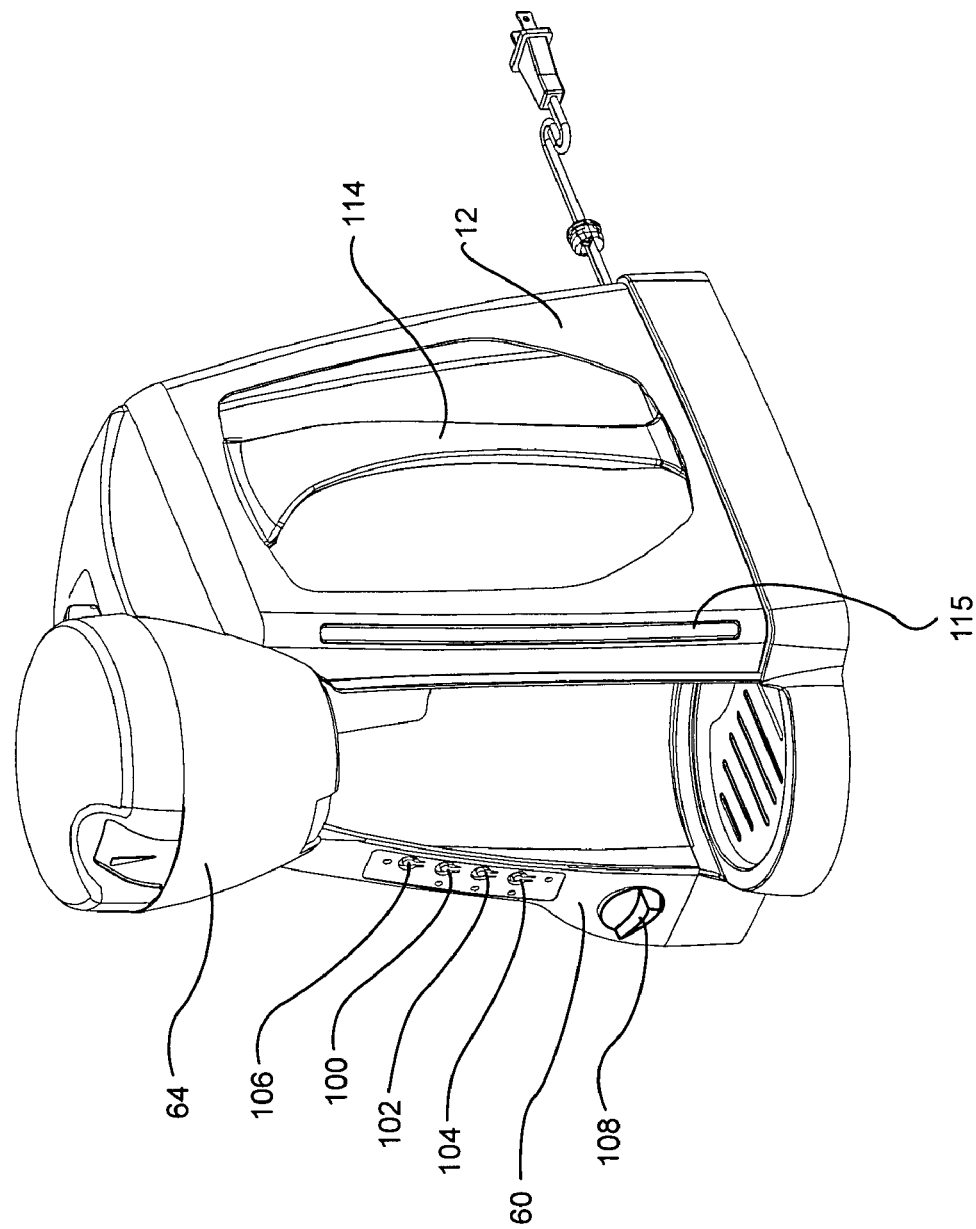
FIG. 7 is a further top perspective view of the coffee maker shown in FIG. 6.

FIGS. 6 and 7 show a coffee maker having various user controls for the system as described above with respect to FIGS. 1 and/or 5 and showing a preferred arrangement of the main housing 60, the secondary housing 64 that contains the brewing chamber and the removable water tank or reservoir 12. The same reference numerals are used to designate similar, though not necessarily identical, elements as those shown in FIGS. 4A-4C. In this preferred embodiment, the user is provided with three buttons 100, 102, 104 for selecting the volume of water to pass through the brewing chamber or the hot water outlet. The buttons are electrically connected to the controller 26 as shown in FIG. 1. The three volumes that can be selected are 7-8 oz., 14-16 oz., and 40 oz. It will be appreciated that the controller can be programmed to cause different volumes to be pumped upon pushing the buttons. The buttons can be replaced by suitable alternatives such as an electronic control panel with contact switches or a dial. While operating controls could be provided to allow a user to select any of a continuous range of volumes, the ability to choose from only a discrete set of volumes is preferred.

The coffee maker further includes a power/cancel button 106 to turn it on and off. A dial 108 is provided for controlling the position of the three-way valve 92 shown in FIG. 5. By turning the dial, the user can cause hot water to be pumped to either the hot water outlet 94 or the brewing chamber 20. A forty ounce carafe 126 is shown positioned on the base 112 in FIG. 6.

FIG. 7 shows the coffee maker without the carafe positioned on the base. The water tank or reservoir 12 is shown adjoining one side of the main housing of the coffee maker. The reservoir includes an integral handle 114 to facilitate its removal from the base of the main housing and transport to a source of water. It also preferably includes at least one clear wall 115 that allows the user to see the amount of water contained therein. The reservoir may be similar in construction to removable reservoirs used in association with humidifiers. Specifically, it may include a valve (not shown) that is opened upon engagement with an actuating member, such as a pin, when mounted to the base of the coffee maker. Once the valve is opened, fluid communication is established between the reservoir 12 and the pump 14.

Figure 8:
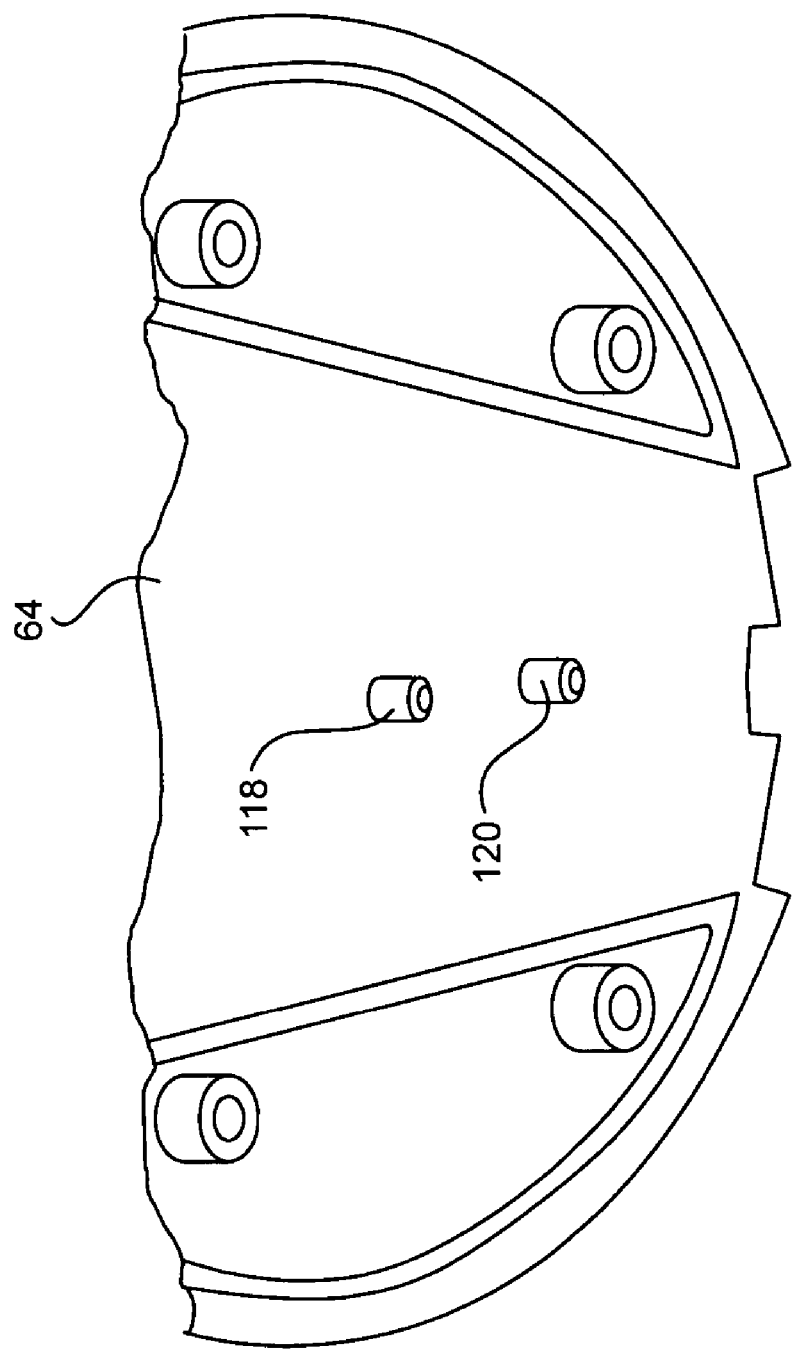
FIG. 8 is a bottom perspective view of the brewing chamber showing separate, adjacent outlets for hot water and coffee.
Figure 9:
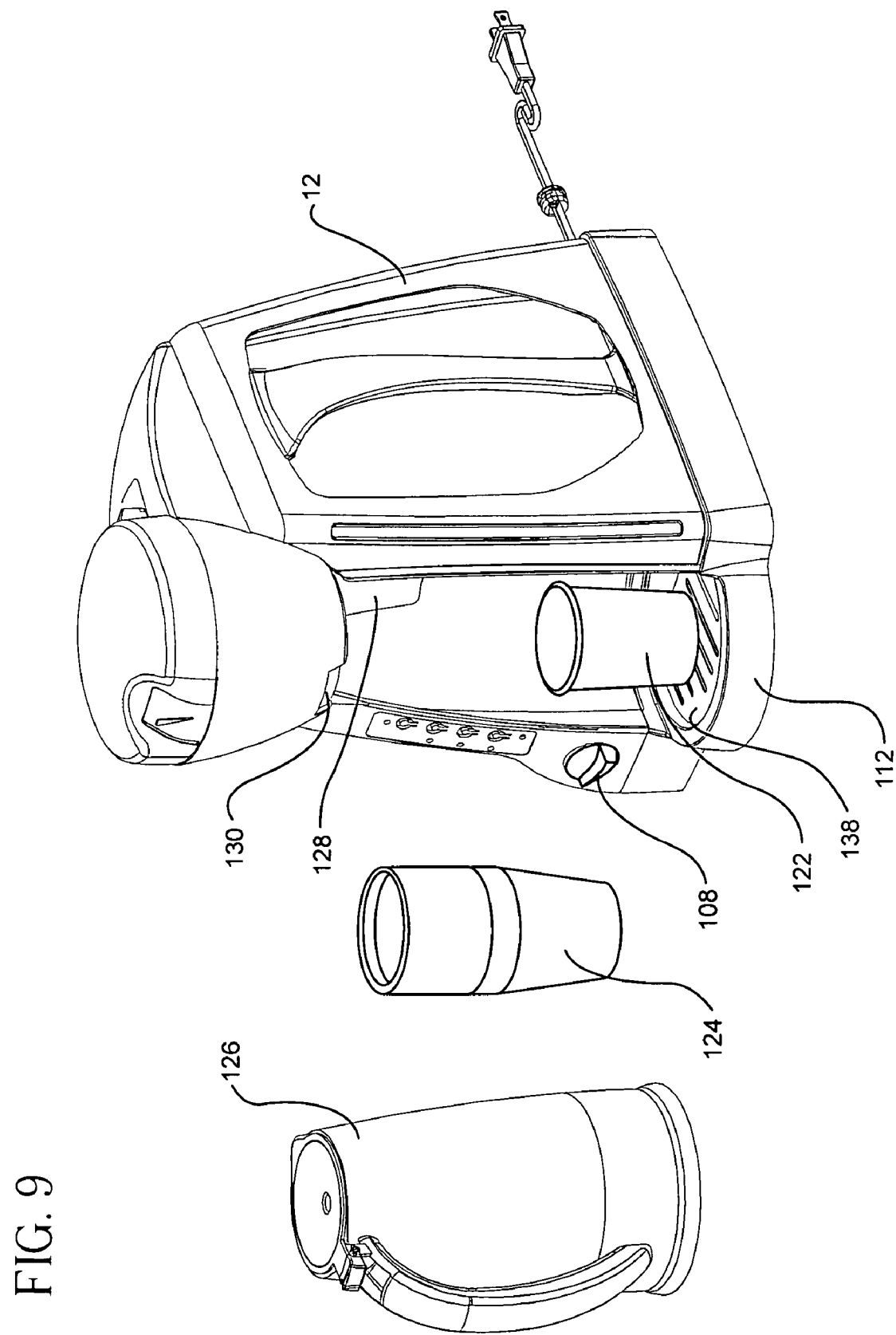
FIG. 9 is a top perspective view showing the coffee maker of FIG. 6 and various vessels that may be employed in conjunction with the coffee maker.

Referring to FIG. 8, the bottom wall of the secondary housing 64 that contains the brewing chamber 20 is shown. A first nozzle including a coffee exit hole 118 that communicates with the bottom opening 46 of the carafe filter insert (see FIG. 1) or other opening in the brewing chamber is provided on this wall. A second nozzle including a water exit hole 120 is mounted to the bottom wall of the secondary housing and is part of the hot water outlet 94 shown schematically in FIG. 5. The hot water nozzle is connected by a fitting (not shown) to the water line from the valve 90. This fitting is mounted to the secondary housing. The water exit hole 120 is located slightly to the rear of the coffee exit hole in this preferred embodiment. The close proximity of the coffee and water exit holes 118, 120 allows the user to place a cup or other vessel in substantially the same position whether coffee or water is drawn.

Figure 10:
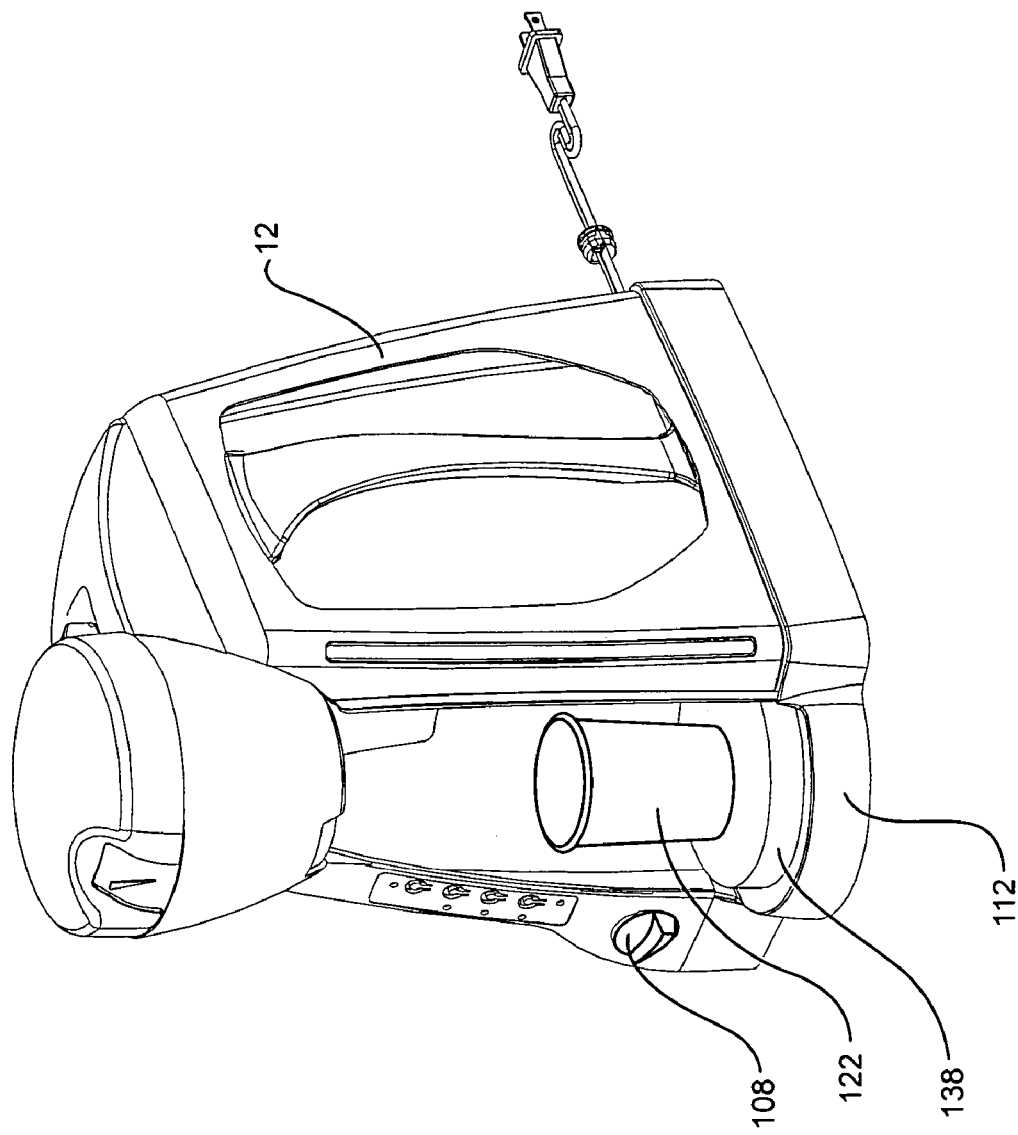
FIG. 10 is a top perspective view showing a coffee maker having a drip tray that provides additional elevation for a cup positioned beneath the brewing chamber.
Figure 11:
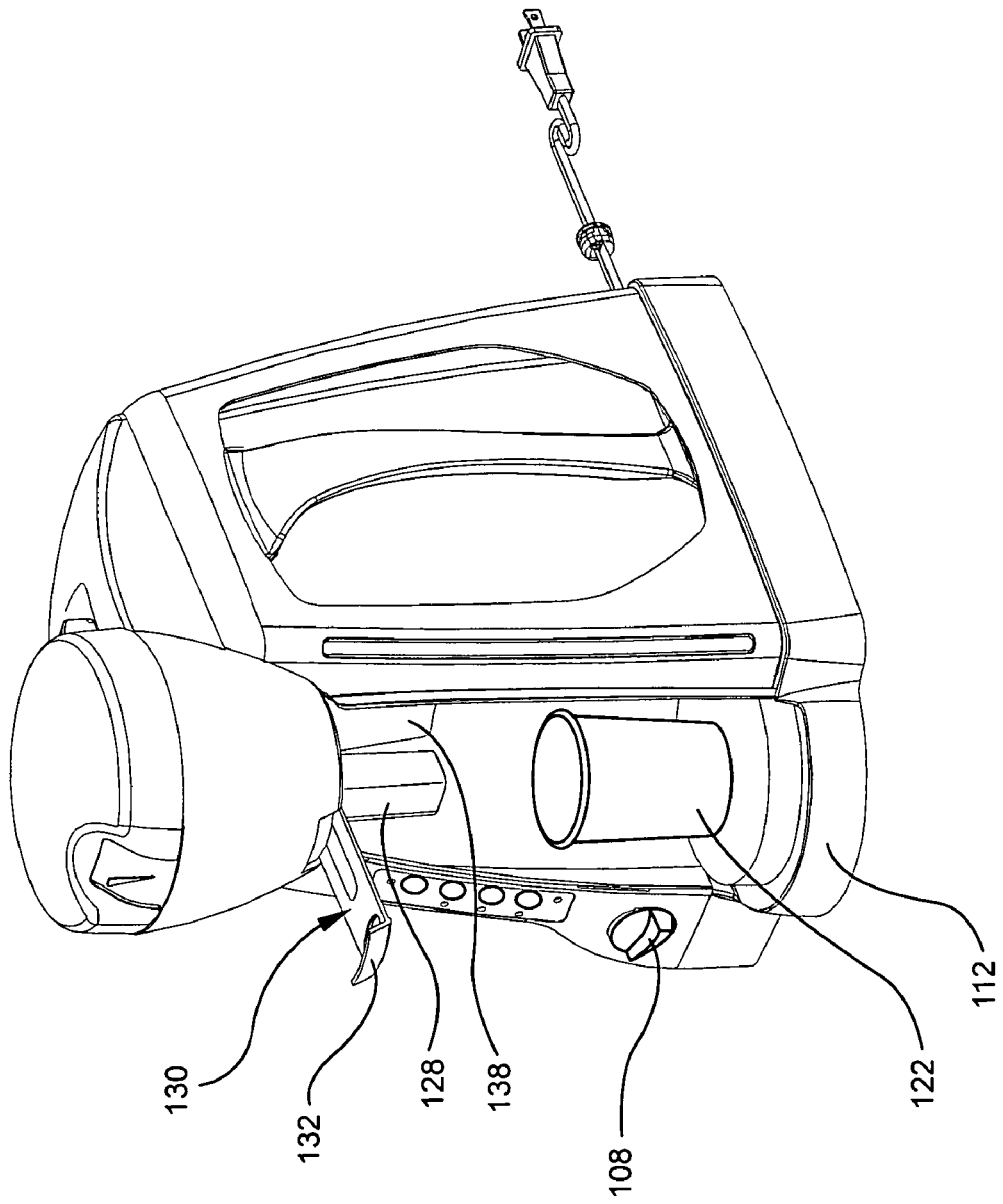
FIG. 11 is a top perspective view of the coffee maker shown in claim 10 wherein a spout is positioned in an actuated position.
Figure 12:
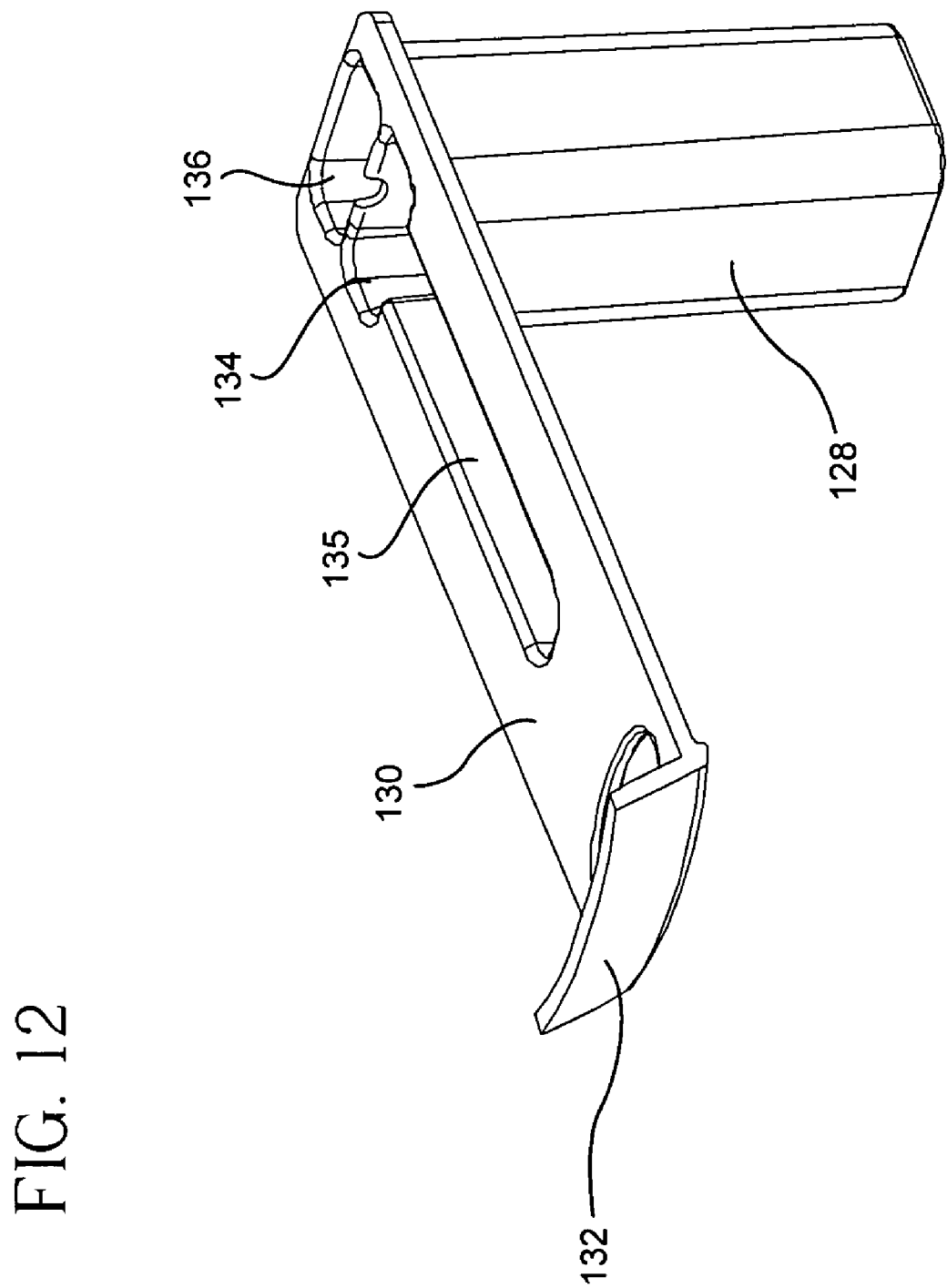
FIG. 12 is a top perspective view of a retractable spout for a coffee maker.

FIGS. 9-12 illustrate elements that are employed in the coffee maker to facilitate the use of vessels of various heights, namely an eight ounce cup 122, a sixteen ounce travel mug 124, and a forty ounce carafe 126. The distance between the exit holes 118, 120 and the base 112 of the housing must be sufficient to accommodate the tallest vessel to be used with the coffee maker. A liquid spout 128 is accordingly employed to reduce splashing when coffee or water is dispensed into a relatively short vessel. The spout 128 is incorporated as part of a pull tray 130. The end of the pull tray includes a tab 132. This assembly is similar to that shown in FIG. 4C, though not identical. As shown in FIG. 12, the spout includes forward and rearward channels 134, 136 which are separated by a wall to avoid mixing hot water with brewed beverages. The forward channel is vertically aligned with the coffee exit hole 118 while the rearward channel 136 is aligned with water exit hole 120 when the tray 130 is fully extended as shown in FIG. 11. Both nozzles extend through the elongate slot 135 when the spout is retracted into the main housing. The main housing of the coffee maker includes a recess 137 that accommodates the spout 128 when the tray 130 is fully inserted into the housing. This allows the carafe 126 to be positioned on the base and beneath the exit holes 118, 120. The spout 128 is removable from the main housing for cleaning.

FIG. 10 illustrates an additional feature to reduce splashing when a relatively short vessel is to be filled with coffee or hot water. A reversible drip tray 138, when oriented in the position shown, provides a raised platform for a cup 122 or other short vessel.

Figure 13:
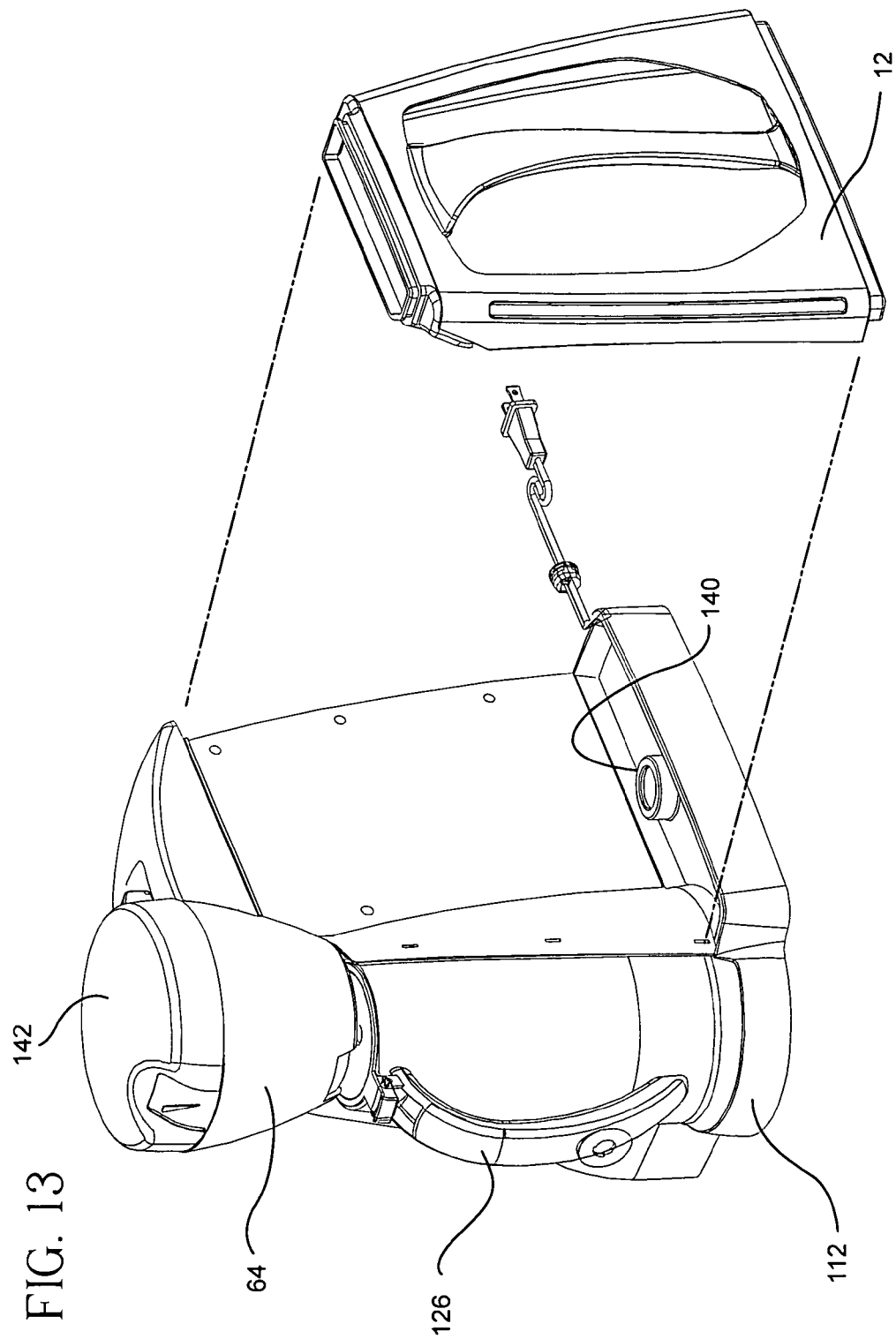
FIG. 13 is an exploded perspective view of the coffee maker of FIG. 7 showing a water reservoir detached from the coffee maker housing.

FIG. 13 shows the coffee maker with the carafe 126 mounted thereto and the reservoir 12 removed from the housing base. A coupling 140 is provided on the base for engagement with a valve 141 (shown in FIG. 5) at the bottom of the reservoir 12. The coupling may include a post for opening the valve and a rubber boot. When placed on the base, the post causes the valve to open while the boot provides an effective seal against leakage. The valve closes automatically upon removal of the reservoir from the base. A valve including a spring plunger can be effectively employed.

Figure 14:
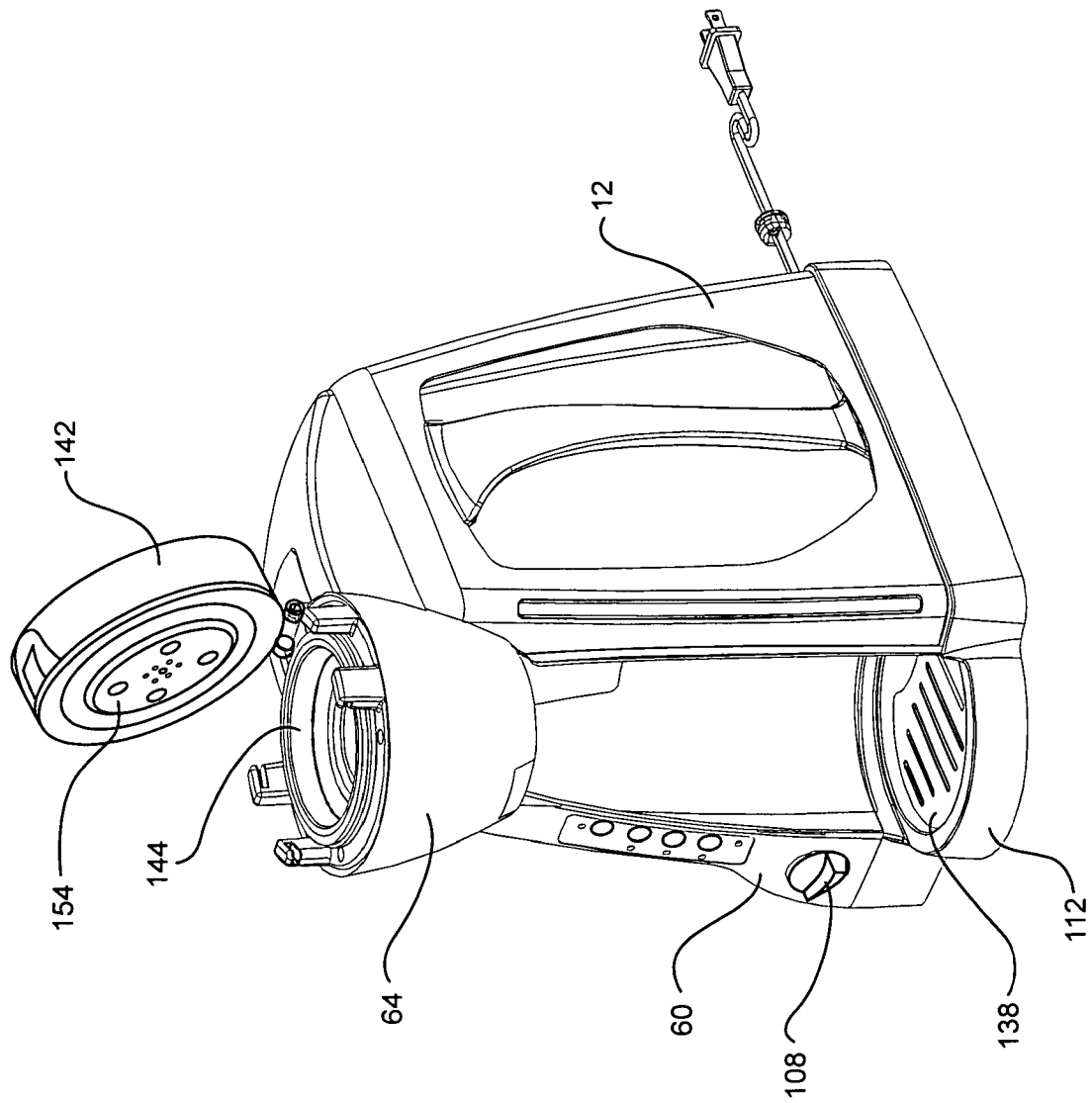
FIG. 14 is a top perspective view showing the cover of the coffee maker in the open position.
Figure 15:
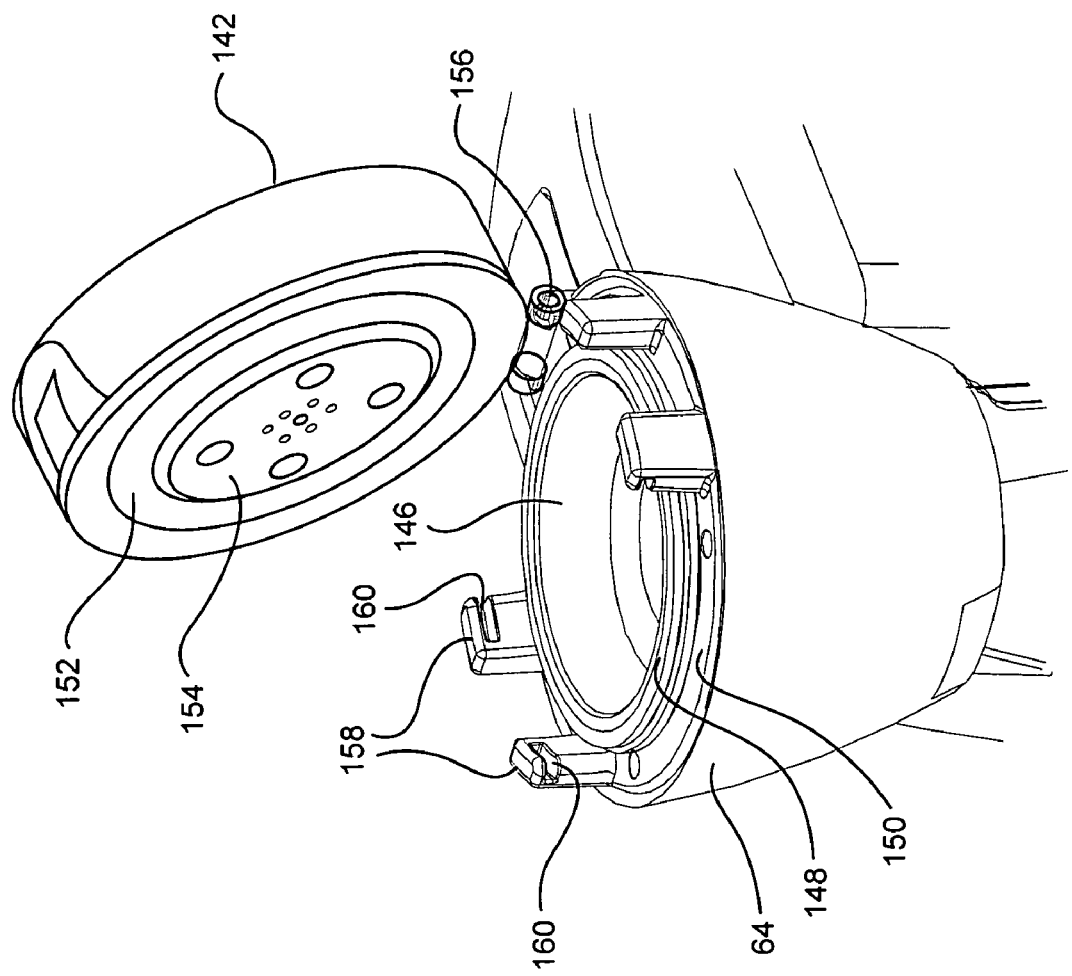
FIG. 15 is a top perspective view showing the cove of the brewing chamber of the coffee maker in an open position.

The secondary housing 64 that contains the brewing chamber is shown with an open lid 142 in FIGS. 14 and 15. In FIG. 14, a pod basket 144 is mounted to the housing. The pod basket is capable of supporting a coffee pod used to make a single cup of coffee or two such pods. It is a cup-shaped vessel having a bottom opening. A set of posts or other raised elements (not shown) within the vessel prevent the pods from closing off the bottom opening. The pod basket can be removed and replaced by a loose ground basket 146 as shown in FIG. 15. Like the pod basket, it includes a rim 148 for supporting it on the upper surface 150 of the bottom half of the secondary housing 64. The bottom of the basket is porous, and may be formed as a molded-in nylon or metal (stainless steel) screen. The basket may alternatively be adapted for use with a disposable paper filter. The lid 142 includes a sealing ring 152 capable of forming a sealing engagement with the rim of either the pod basket or the loose ground basket. A distributor plate 154 is positioned within the ring 152 and includes a plurality of openings for distributing hot water over either the coffee pod or coffee grounds in the brewing chamber. The lid may further include a flexible spring clip (not shown) for engaging a coffee pod when closed.

Figure 17:
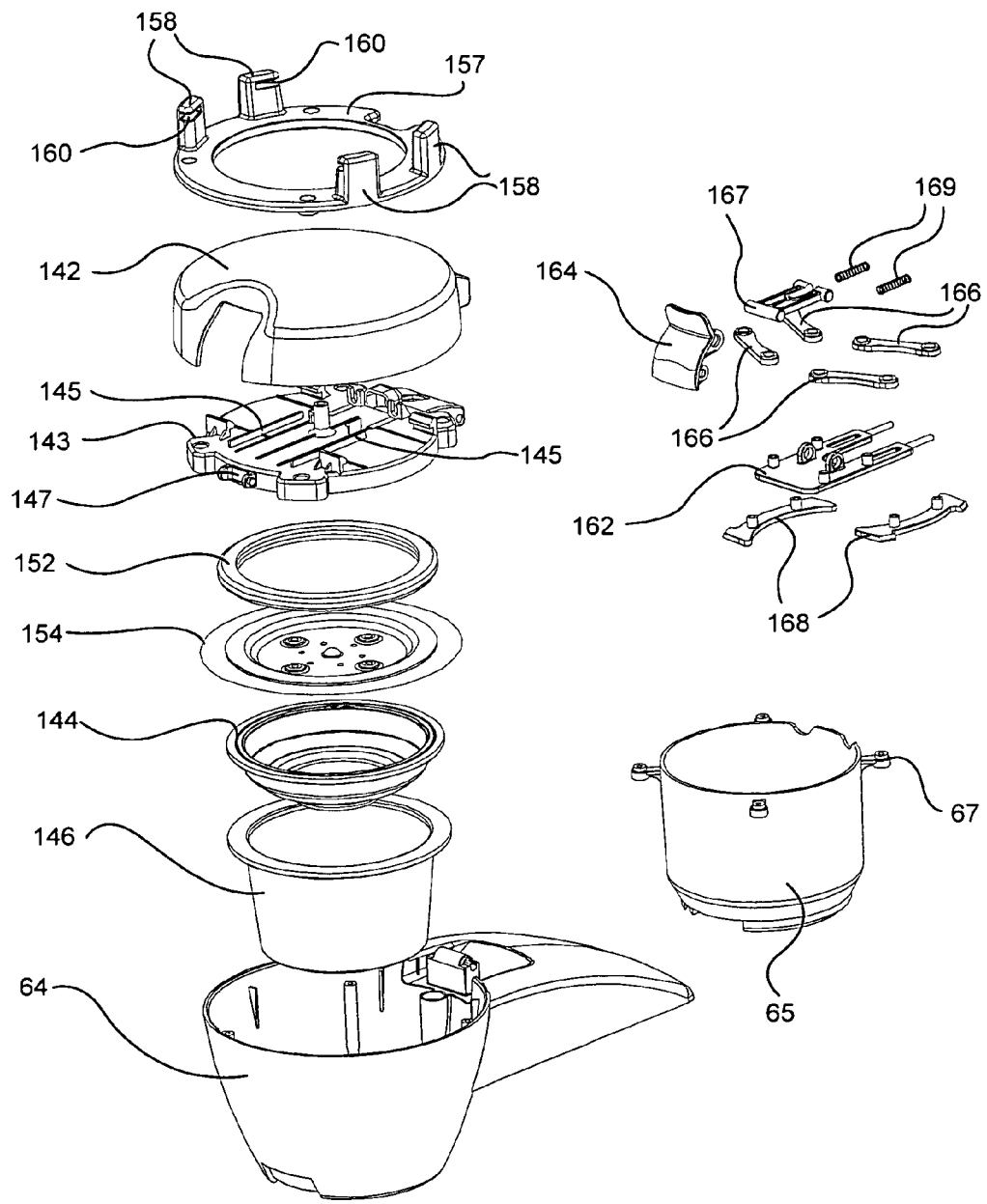
FIG. 17 is an exploded perspective view of the brewing chamber and associated components of the coffee maker shown in FIG. 14.
Figure 18:
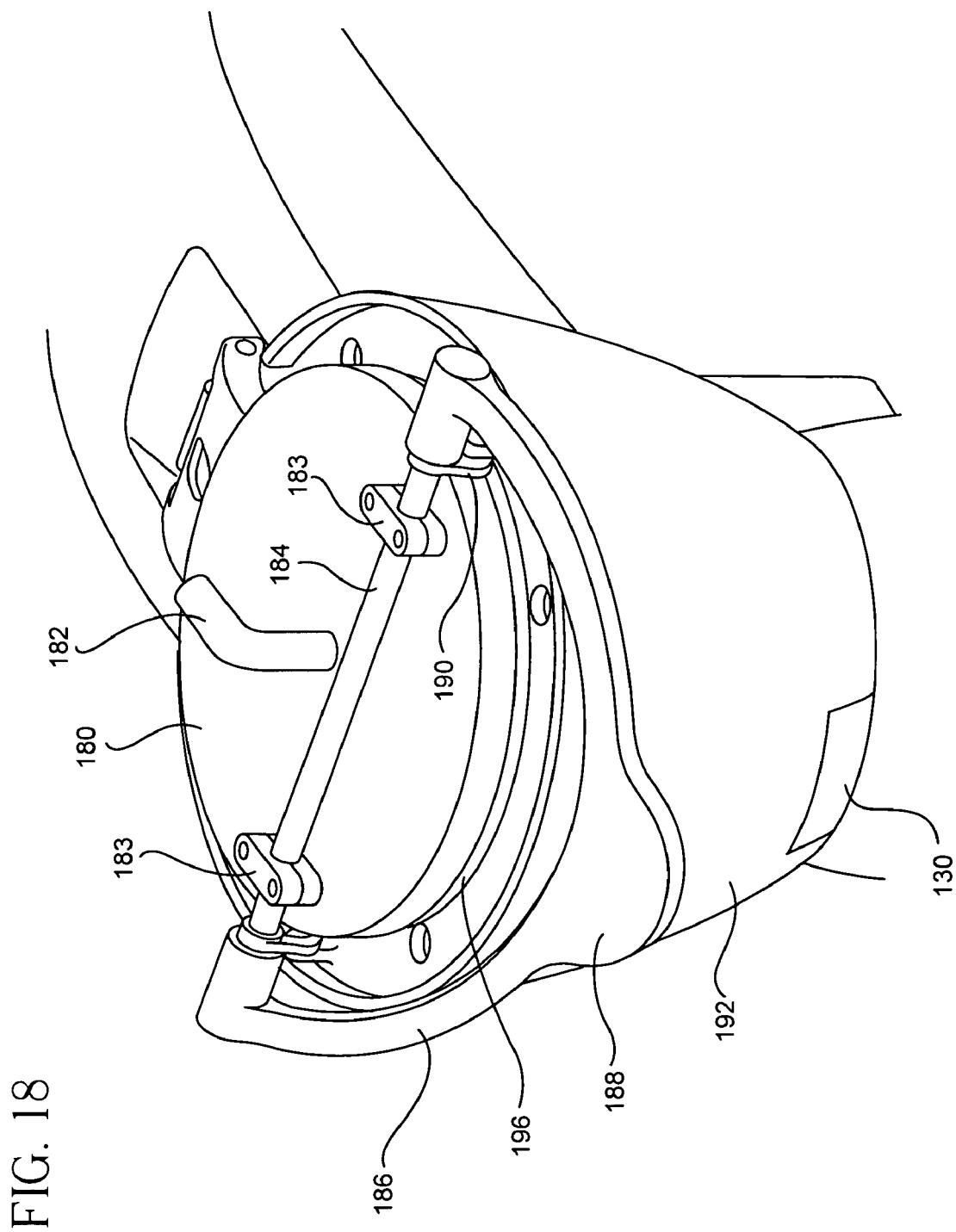
FIG. 18 is a top perspective view of a latching assembly for the cover of a brewing chamber in accordance with a further embodiment of the invention.
Figure 19:
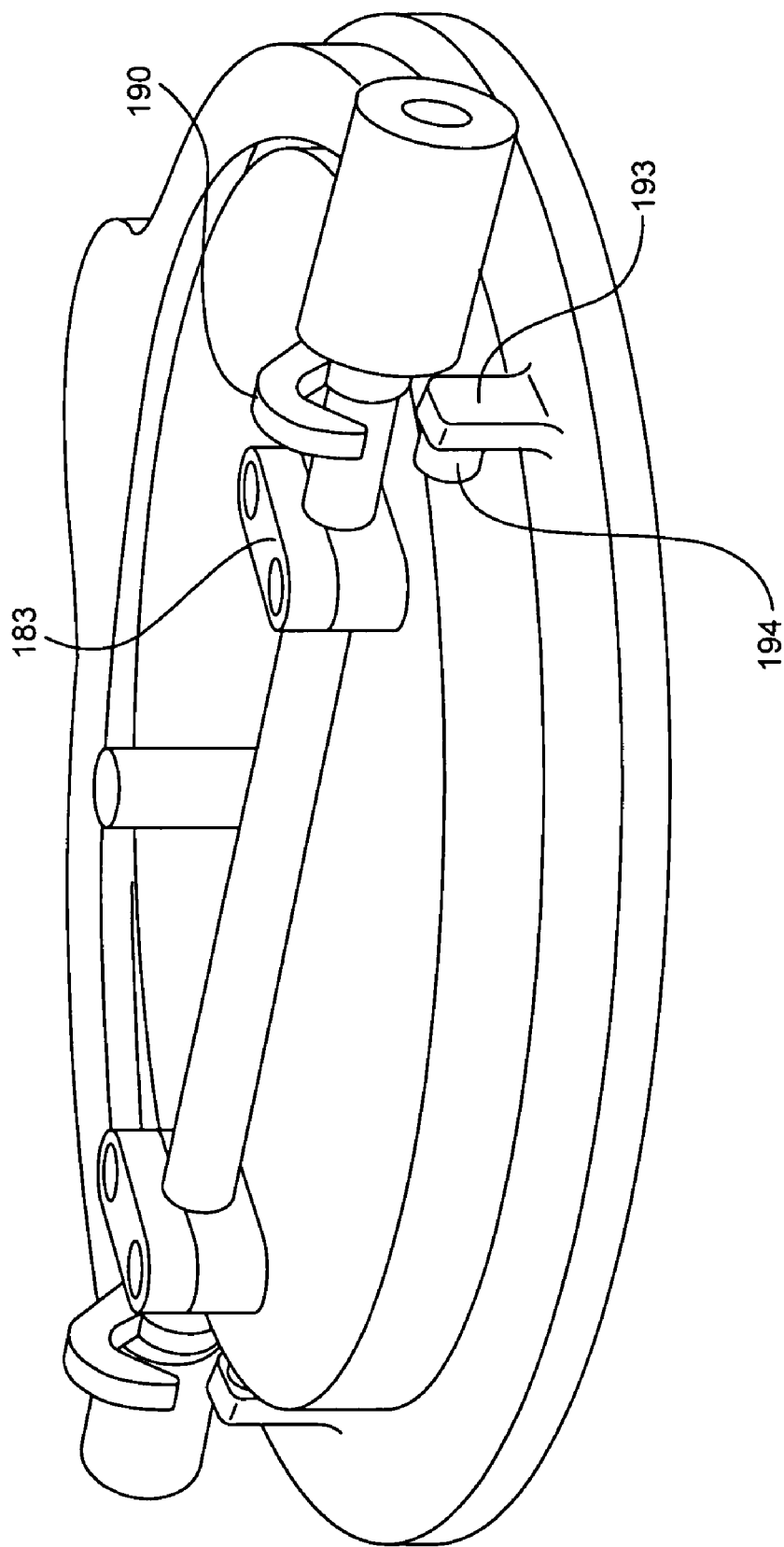
FIG. 19 is a top perspective view of the latching assembly shown from a different perspective.
Figure 20:
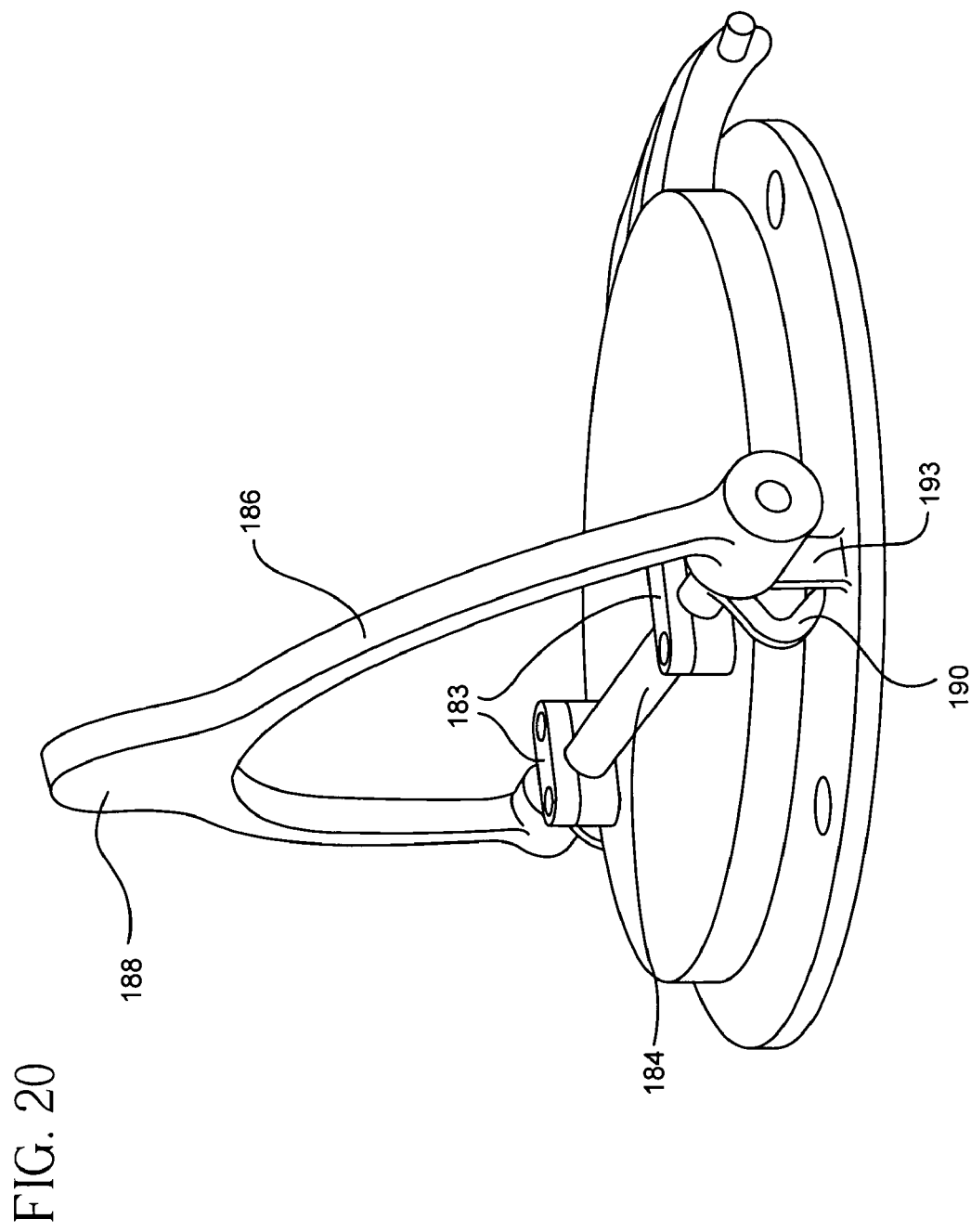
FIG. 20 is a top perspective view showing the latching assembly in an open position.
Figure 21:
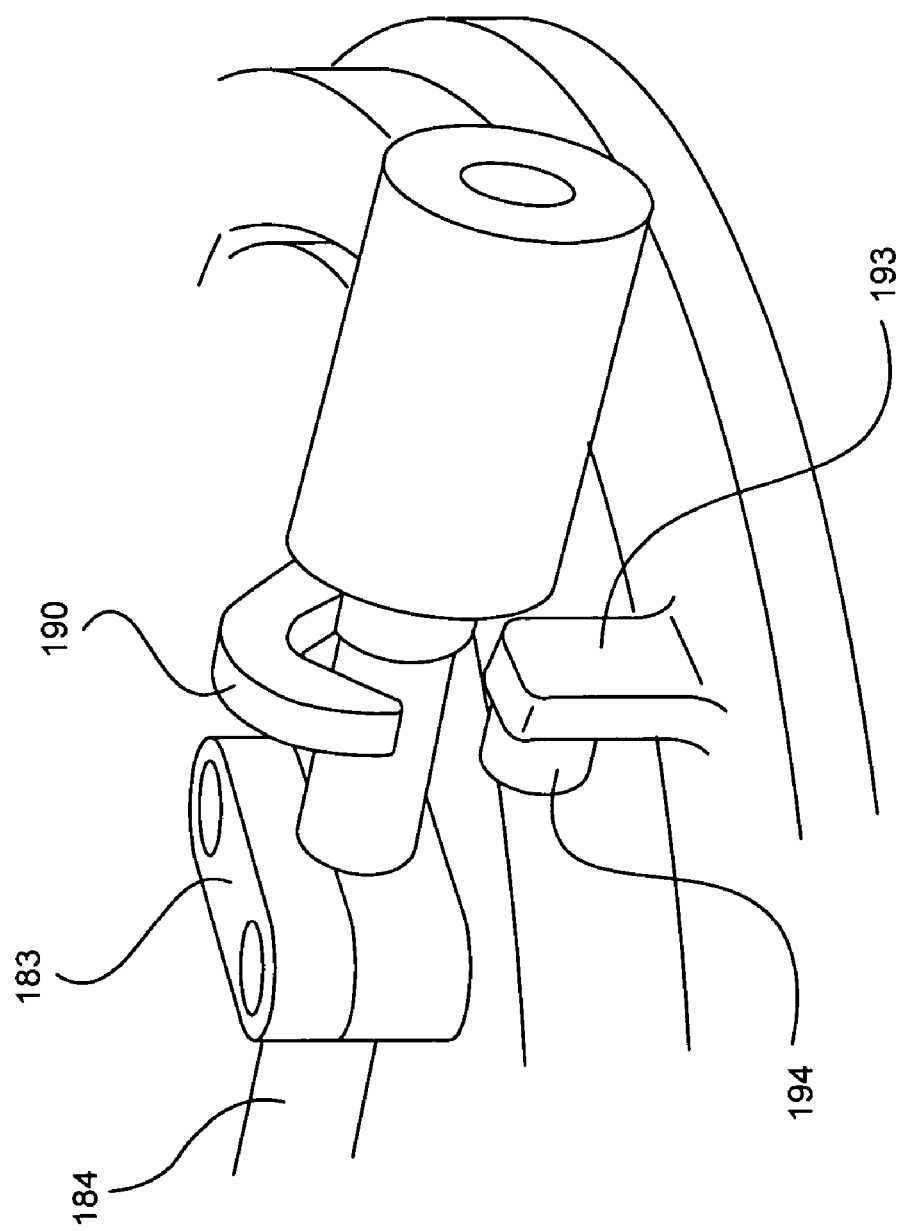
FIG. 21 is an enlarged perspective view of one end of the latching assembly.

The secondary housing 64 generally resembles a clam shell in that the top (lid) and bottom halves are joined by a hinge assembly 156. As the brewing chamber is pressurized when the coffee maker is used to make coffee, the two halves can be coupled by locking members. Referring to FIG. 15, four projections or "towers" 158 extend from the upper surface 150 of the bottom half. The upper surface 150 may be provided by a ring secured to the housing 64. Such a ring is shown in FIG. 17. While four towers 158 are employed in the preferred embodiment, the assembly can be designed with a higher or lower number so long as the pressure exerted by the sealing ring 152 on the rim 148 is substantially evenly distributed. Each tower includes a slot 160 extending within its inner surface.

Figure 16:
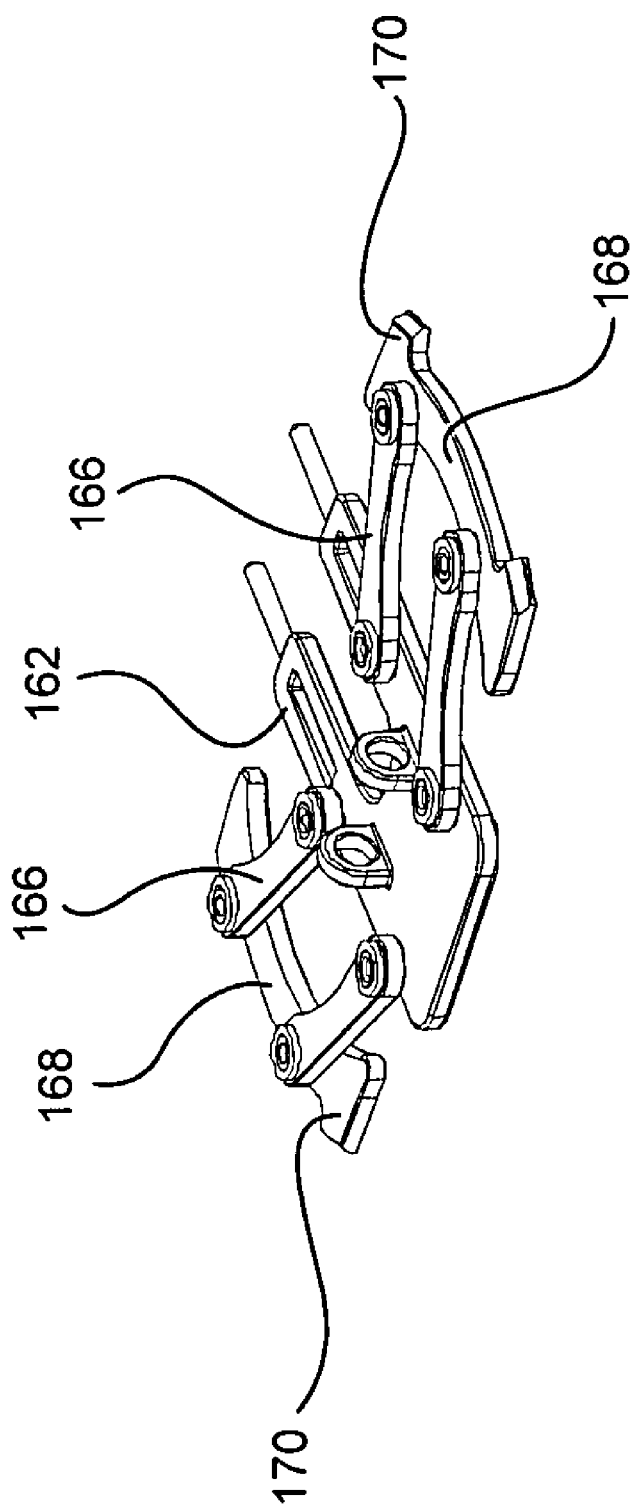
FIG. 16 is a top perspective view of a latching assembly for the cover of the brewing chamber.

Referring to FIG. 16 and FIG. 17, the mechanism for locking the lid to the bottom half of the secondary housing 64 is shown. This mechanism includes a slide 162 that is pivotably coupled to a lever 164. The lever 164 extends outside the lid 142 where it can be manipulated by a user. Two pairs of links 166 are pivotably coupled to the slide 162, one pair on each side. Each pair of links is pivotably coupled to a plate-like locking element 168. Each locking element includes a pair of radially outwardly extending portions 170. In operation, the lid 142 is locked to the bottom half of the secondary housing by urging the slide 162 in a first direction. This causes the links 166 to pivot with respect to the slide and the locking elements to rotate such that the outwardly extending portions 170 thereof enter the slots 160 in the towers 158. The locking elements and associated slots may be arranged to cause the lid to be pressed on the secondary housing. This may be accomplished by providing cam surfaces on the locking elements or within the slots. The sealing ring 152 can accordingly be pressed against the rim of the pod basket or loose ground basket. Separate clamping means may alternatively be provided, as described below, wherein the locking elements 168 would be used only to lock the lid 142. The lid is unlocked by moving the lever 164 such that the slide 162 moves in the opposite direction, causing the outwardly extending portions 170 of the locking elements 168 to exit the slots 160 in the towers 158. The lid may then be opened to gain access to the brewing chamber.

FIG. 17 provides further details of the locking mechanism and cover 142. A water inlet bracket 143 is shown beneath the cover 142 and above the distributor plate 154. A seal 152 is provided between this bracket 143 and the distributor plate. The bracket 143 includes guides 145 for the slide 162 of the locking mechanism.

The latching assembly in this embodiment includes a latch ring 157 from which the towers 158 extend. The latch ring 157 is secured to the housing 64 by screws (not shown) or other suitable attachment means. An inner housing 65 is positioned within the housing 64. Openings in the ring 157 are aligned with holes extending through mounting tabs 67 extending from the inner housing 65. This allows both the ring 157 and inner housing 65 to be secured to the secondary housing 64 using the same fasteners. Springs 169 are provided for urging the slide 162 forwardly. The lever 164 is pivotally coupled to the slide 162 by a link 167. It is also pivotally coupled to the water inlet bracket 143, which includes a mounting fixture 147 adapted for engaging eyelets extending from the lever 164.

As the brewing chamber is pressurized while the pump is operated, hot water readily flows through the coffee pod or loose grounds in the brewing chamber and into a vessel positioned beneath it. As discussed above, an air pump is provided for purging residual liquid from the grounds or pod in the brewing chamber following the end of the brewing cycle. Because the brewing chamber and associated pod basket or loose ground basket are substantially sealed, it could be difficult for liquid to drain from the area outside the basket once the pump has stopped. One or more air vents (not shown) are accordingly provided near the upper end of the brewing chamber. The vents allow liquid to drain from the brewing chamber by preventing a "vacuum effect" that would otherwise impede drainage from the closed system under the basket.

Figure 22:
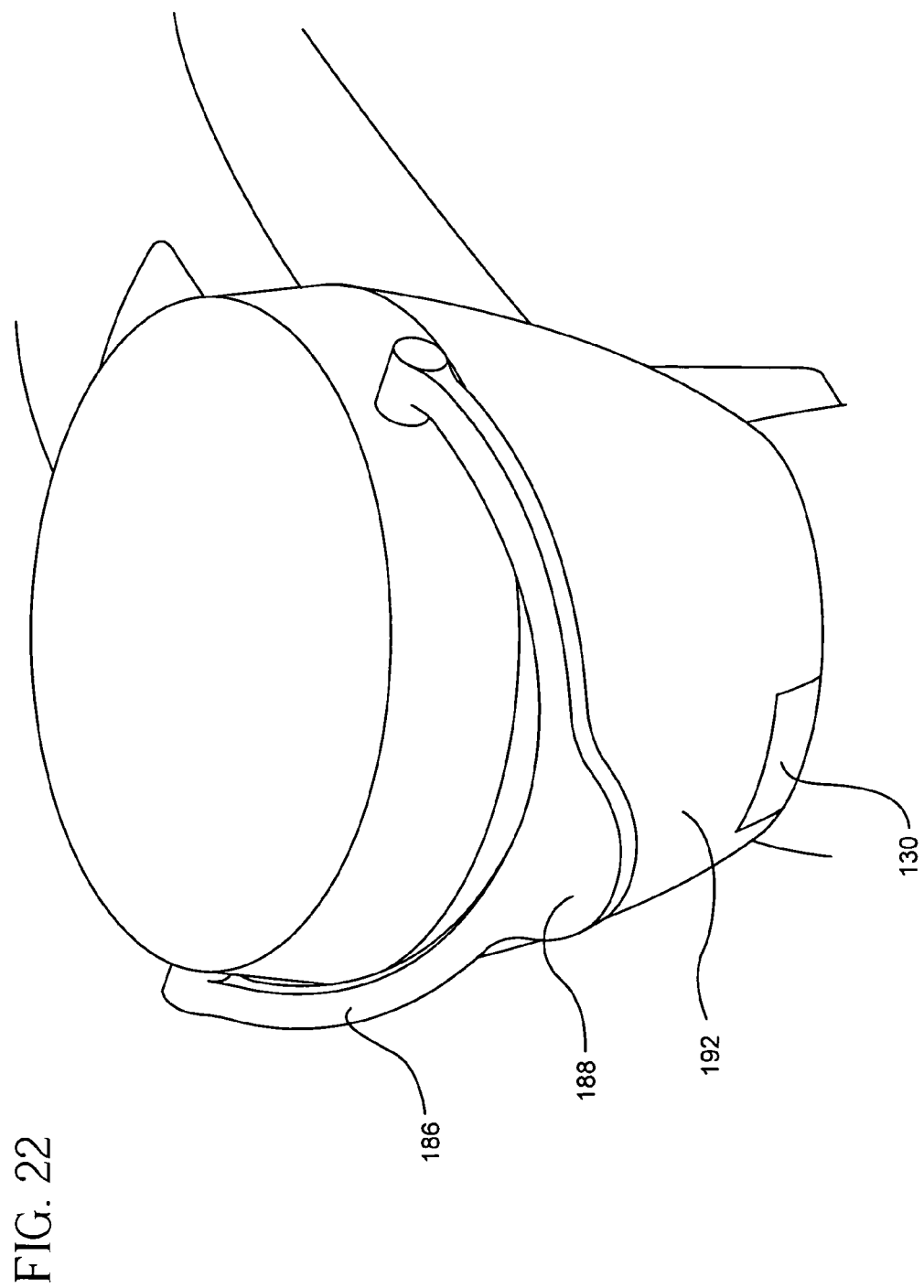
FIG. 22 is a top perspective view showing a brewing chamber with the latching assembly in the closed position.

As described above, assemblies other than those disclosed in the previous embodiments may be employed to lock the lid and ensure an effective seal between the lid and brewing chamber. Referring to FIGS. 18-22, a water inlet bracket 180 is shown coupled to a water inlet 182. Such a bracket is part of the lid coupled by a hinge to the coffee maker housing, and may be similar to the bracket 143 coupled to the distributor plate 154 shown and described above. The bracket 180 includes a pair of upwardly extending supports 183 projecting from its upper surface. An axle 184 extends through openings in the supports 183. A generally C-shaped lever 186 is secured to each end of the axle 184. A tab 188 extends radially outwardly from the lever to facilitate its use. A pair of hooks 190 is coupled to the axle 184, each being located outside the water inlet bracket. The housing 192 for the brewing chamber has an upper surface including pins 194 positioned for engagement with the hooks 190 when the lever 186 and axle 184 are rotated downwardly. The upper surface may be the upper surface of a ring secured to the housing, similar to the assembly shown in FIG. 17. Rather than having slotted towers projecting from the ring, a pair of opposing vertical projections 193 support the horizontally extending pins 194. As the hooks move under the pins, the water inlet bracket, distributor plate and annular seal 196 coupled thereto are urged towards the pod or coffee ground insert (not shown). A water-tight seal is thereby provided between the annular seal 196 and the rim of the insert. Most of the above-described mechanism is covered by a lid cover 195 as shown in FIG. 22, the lever being accessible to the user. It will be appreciated that the hooks and pins may be configured differently from those shown so long as they cause the sealing assembly to be pressed into sealing engagement with the pod or coffee ground insert.

Figure 23:
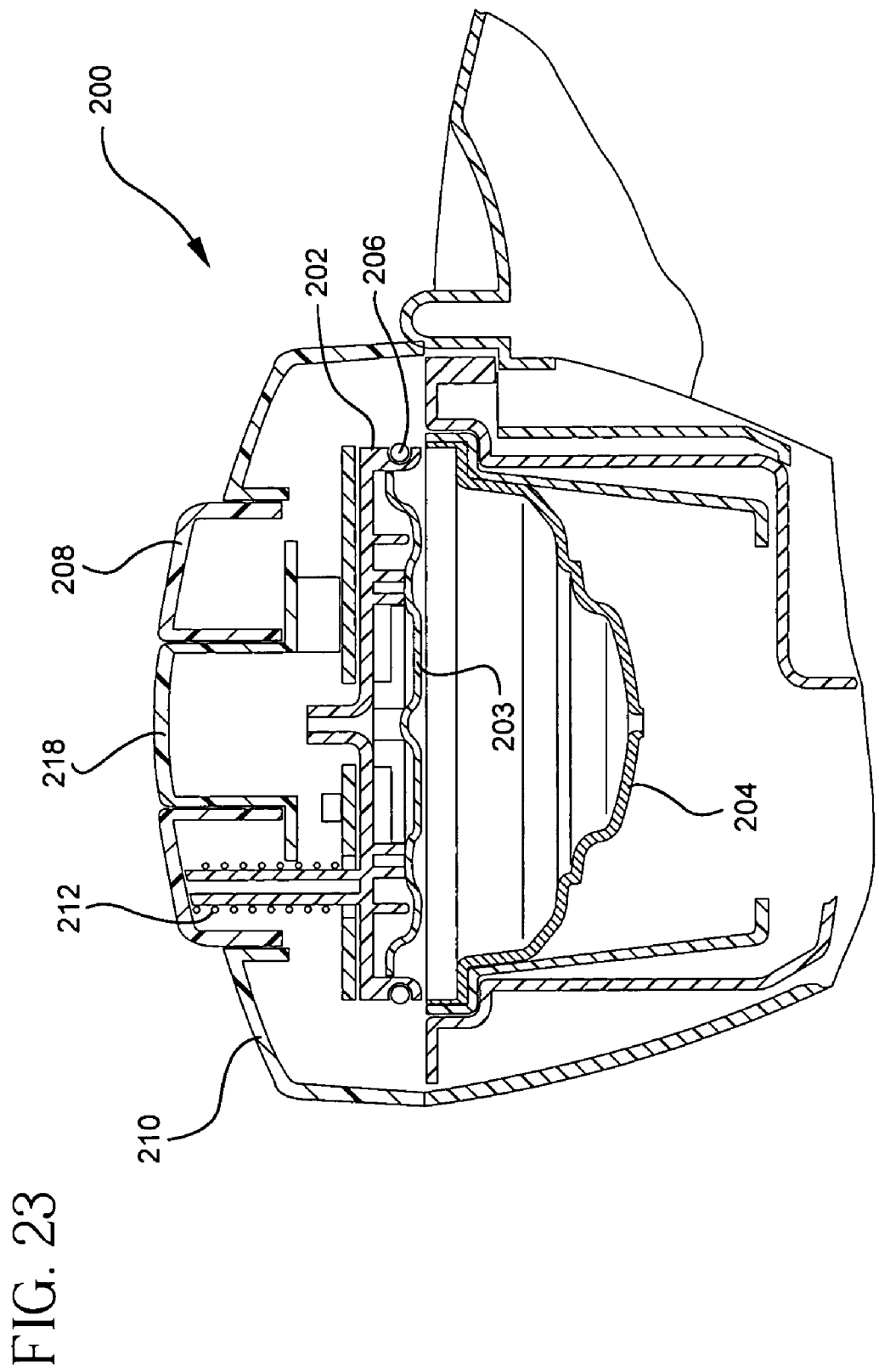
FIG. 23 is a sectional view showing a brewing chamber having a cover latching assembly in accordance with a further embodiment of the invention.

The assembly 200 shown in FIGS. 23-27 is preferred, and includes a vertically movable sealing part, namely a water inlet bracket 202 that can be moved into and out of sealing engagement with the removable pod or coffee ground insert 204. A distributor plate 203 is secured to the water inlet bracket. An o-ring seal 206 is mounted to the sealing part 202. A vertically movable actuating member in the form of a lock button 208 is provided for urging the sealing part downwardly such that the O-ring seal moves into sealing engagement with an inner vertical surface of the insert. As shown in FIG. 23, the lock button extends above the surface of the lid 210 for the brewing chamber when the sealing part is in the non-sealing position. A spring 212 resiliently urges the lock button and an associated release button 218 upwardly with respect to the lid 210.

Figure 24A:
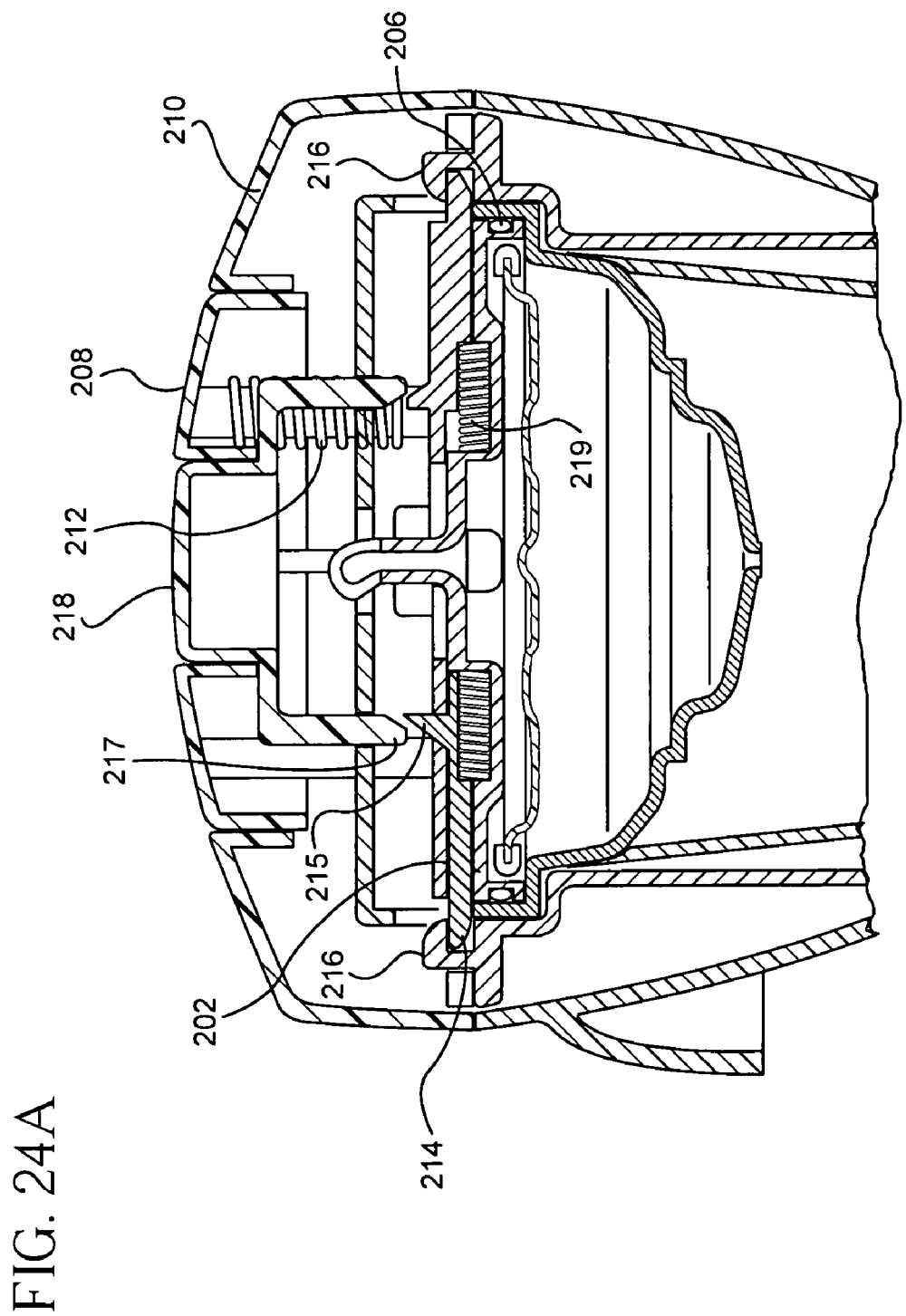
FIG. 24A is a sectional view showing the brewing chamber with a latching assembly in the locked position.
Figure 24B:
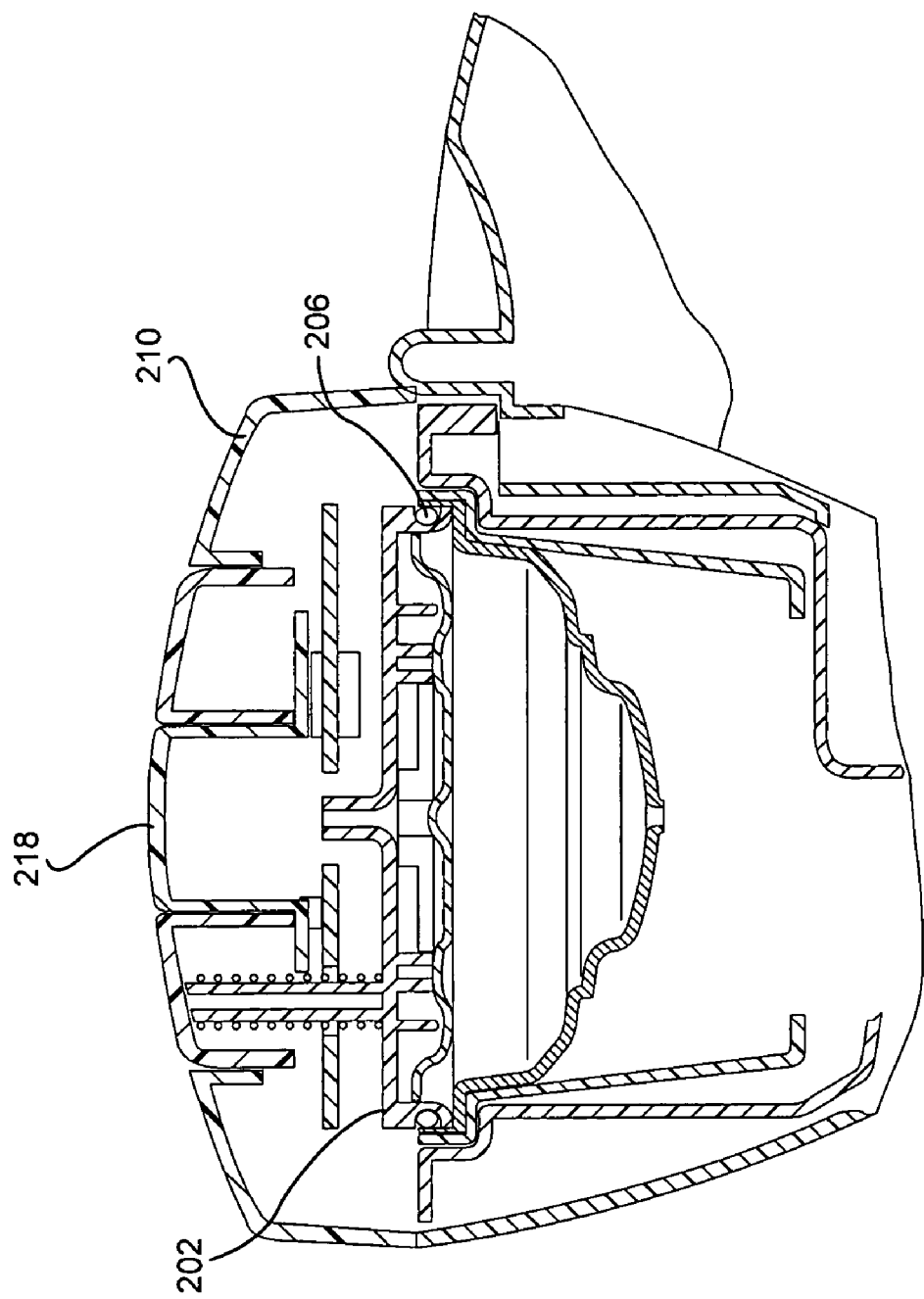
FIG. 24B is a further sectional view showing the latching assembly in a locked position.

As shown in FIG. 24A, the top surface of the lock button 208 is pressed downwardly from the position shown in FIG. 23 such that it is substantially flush with the top surface of the lid when the sealing part is moved to the sealing position. This provides a visual indication to the user that the brewing chamber is properly sealed. Locking pins 214 extending radially outwardly from the sealing part maintain it in the sealing position. The housing for the brewing chamber or a ring secured thereto includes projections 216 that are configured to received the pins 214 when the sealing part 202 is fully pushed down, locking it in place. The O-ring seal 206 is compressed between an inner vertical surface of the pod or coffee ground insert and the outer vertical surface of the water inlet bracket 202 when the sealing assembly is positioned as shown in FIGS. 24A and 24B.

Figure 25:
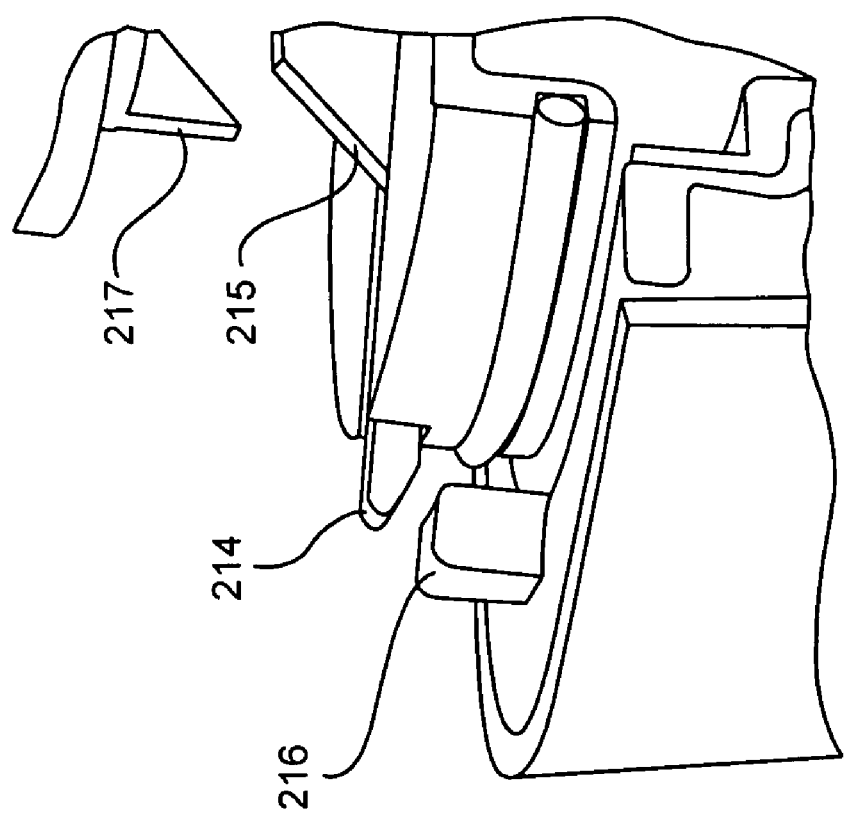
FIG. 25 is a perspective view showing a portion of the latching assembly including a locking pin.
Figure 26:
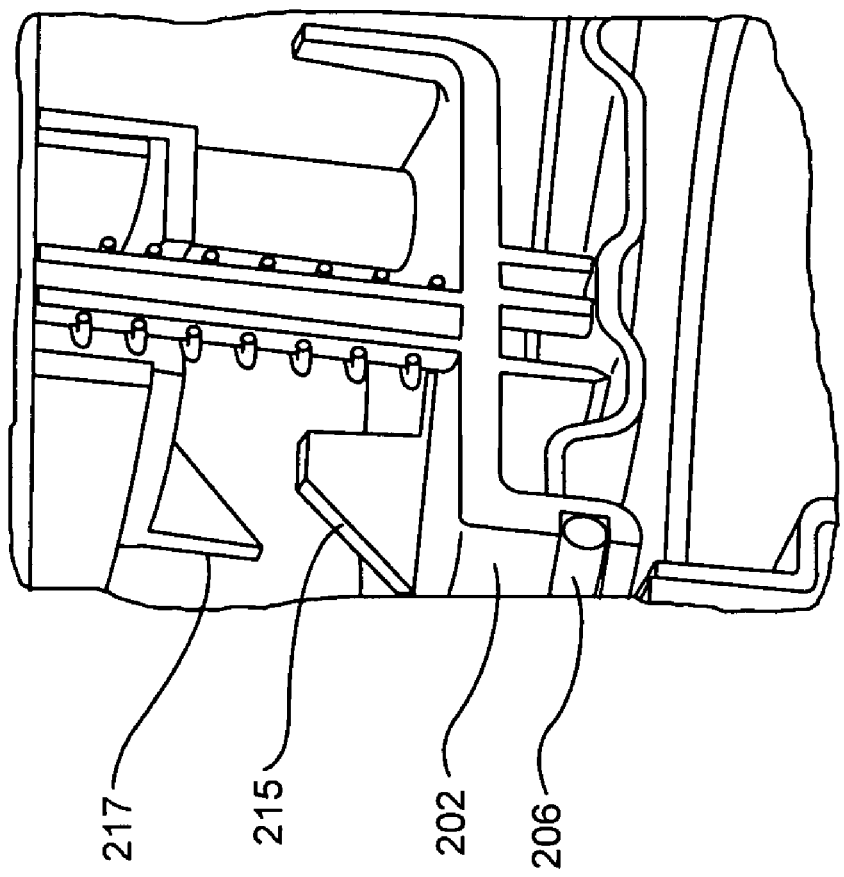
FIG. 26 is a perspective view showing an actuating mechanism for the locking pin.
Figure 27:
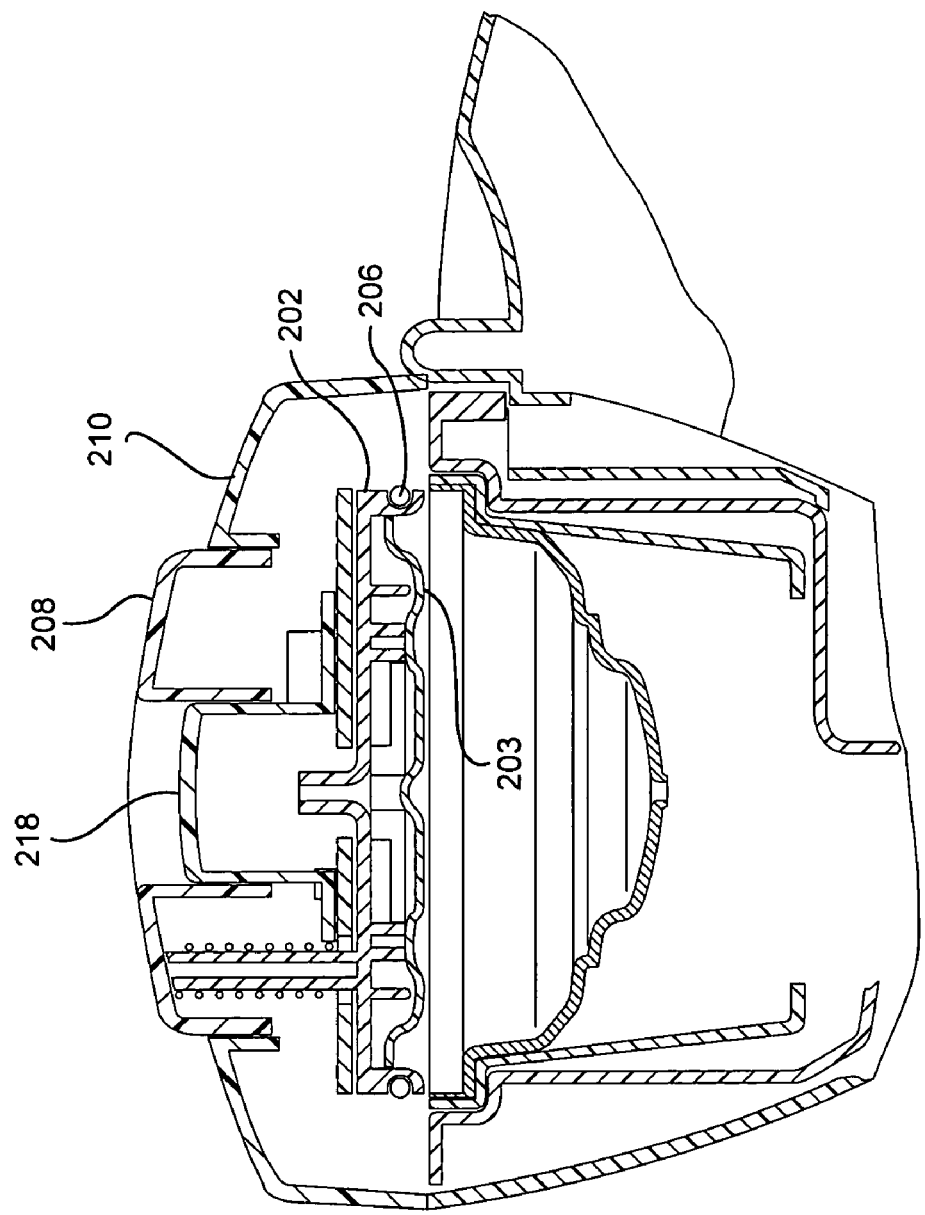
FIG. 27 is a sectional view showing the release of the latching assembly.

The release button 218 is provided for releasing the locking pins 214. This button 218 is movable with respect to the lock button 208 as shown in FIG. 27. When pressed, the release button moves downwardly with respect to the lock button and causes the locking pins 214 to be released from the projections 216. Referring to FIGS. 25 and 26, the release button is operatively associated with an actuating member 217 having an inclined surface. The inclined surface of the actuating member 217 is engageable with an inclined surface 215 associated with the pin. Springs 219 urge the pins into the recesses of the projections 216. The pins 214 are retracted against the forces of the springs 219 as the release button is pushed. The sealing part 202 is thereby moved upwardly by the spring 212 to the non-sealing position shown in FIG. 23. The insert can then be removed once the lid 210 has been pivoted upwardly about its hinge.

Figure 28:
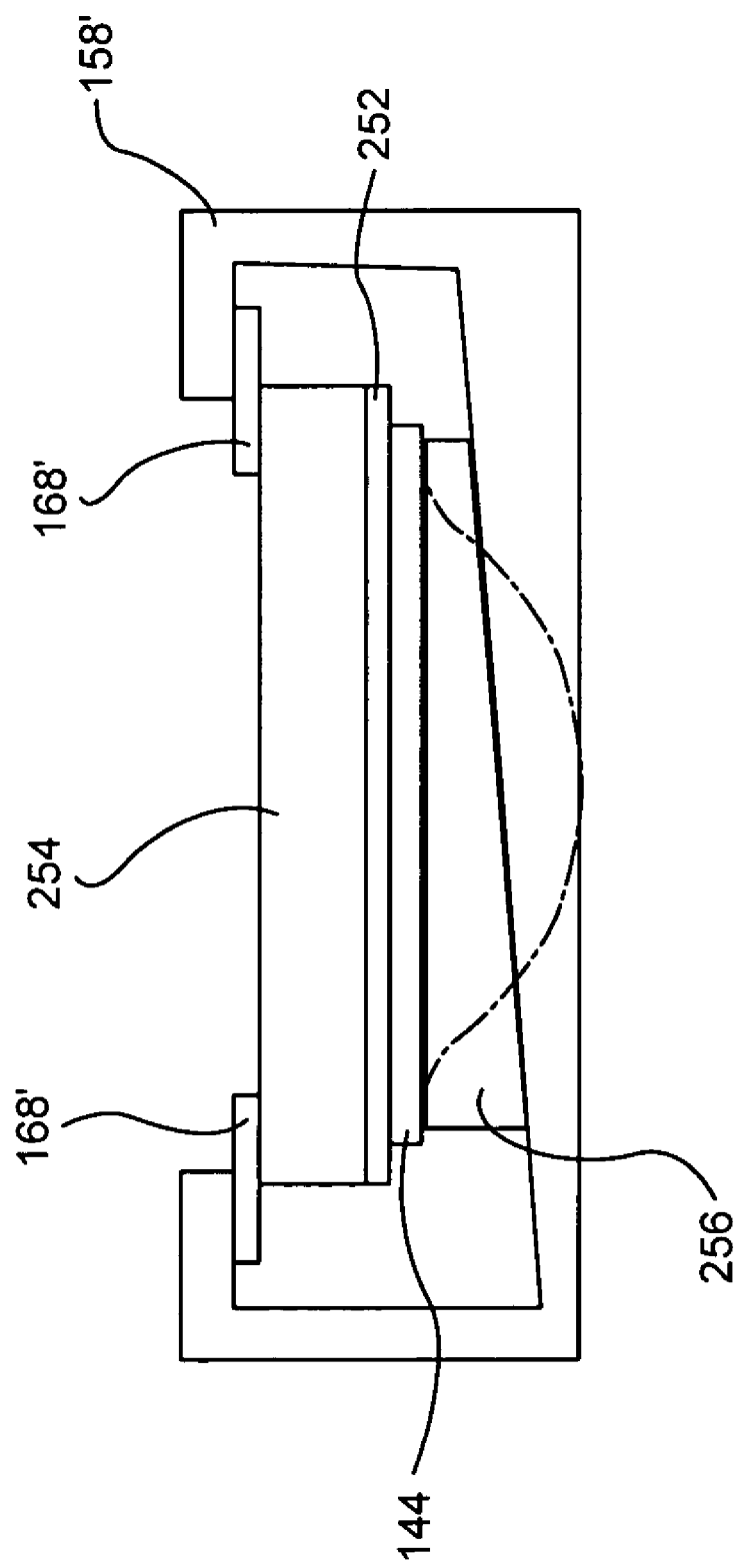
FIG. 28 is a schematic illustration of a further alternative embodiment of a latching and sealing assembly for the cover of a brewing chamber.

The embodiment of FIG. 28 is a modification of the embodiment shown in FIGS. 14-17. The same reference numerals are used to designate similar parts. As shown schematically, the lid includes a distributor bracket and plate 254 and an annular sealing ring 252. The sealing ring 252 is engageable with the rim of a pod basket 144 or a loose ground basket 146, the latter of which is shown in FIG. 15.

A linkage mechanism similar to that shown in FIGS. 16-17 is employed for locking the lid to the secondary housing 64. The linkage mechanism includes locking elements 168' similar to those 168 described above, but lacking any form of camming feature.

The locking elements 168' are moveable radially inwardly and outwardly. When moved outwardly, they are positioned beneath horizontally extending surfaces provided on towers 158' extending from the secondary housing 64. The towers 158' may be identical in construction to the towers 158 shown and described above.

A mechanism is provided for raising the pod basket 144 or loose ground basket 146. In the embodiment shown in FIG. 28, this mechanism includes a camming member 256 that when rotated, forces the pod basket or loose ground basket upwardly against the seal 252.

Figure 29:
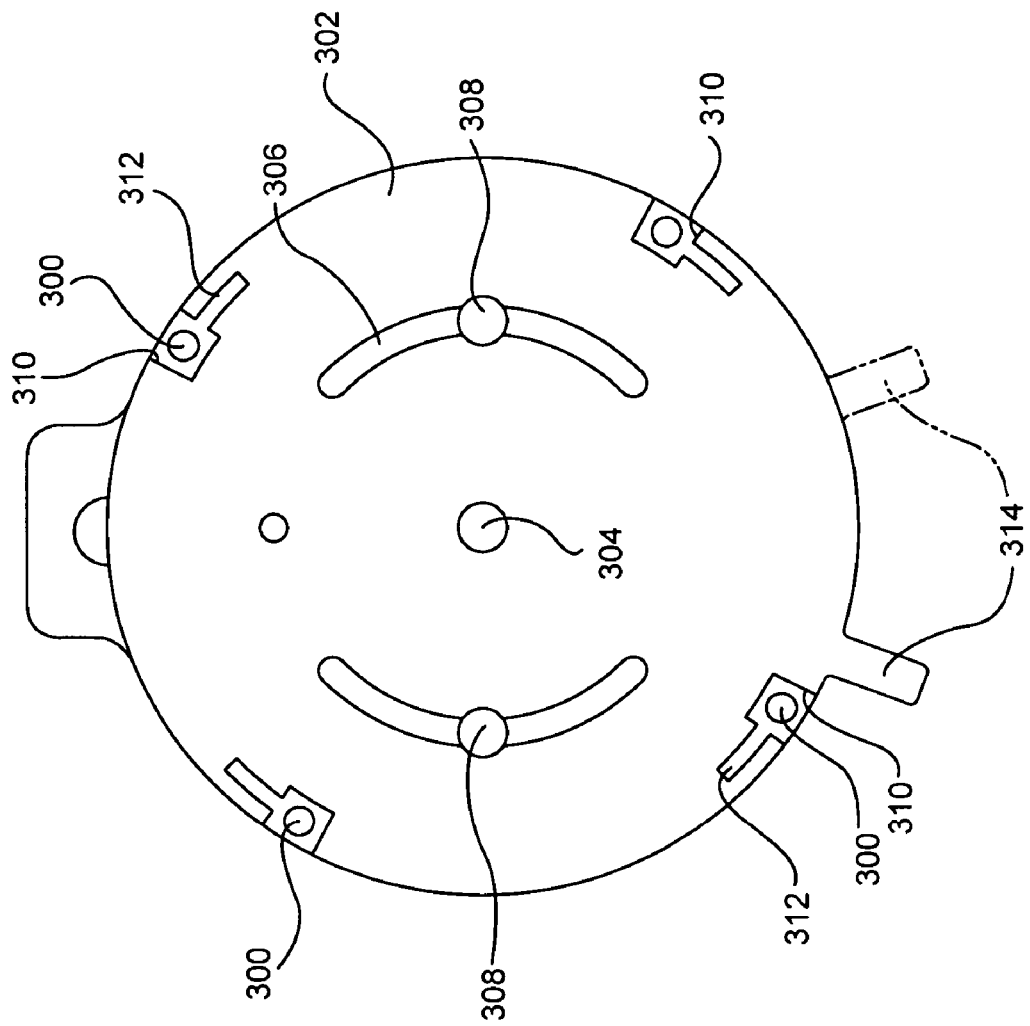
FIG. 29 is a schematic illustration of a further alternative embodiment of a latching and sealing assembly for the cover of a brewing chamber.

A further embodiment of a latching/sealing assembly is shown schematically in FIG. 29. In this embodiment, the towers 158 of the embodiment of FIGS. 14-17 are replaced by columns having substantially spherical balls 300 at their upper ends. The water inlet bracket 302 includes a water inlet 304 at its center. It further includes a pair of arcuate guide slots 306. The ring (not shown in FIG. 29) secured to the brewing chamber housing includes guide posts having spherical upper ends 308. The guide posts extend through the guide slots 306 such that the spherical upper ends 308 are positioned above the upper surface of the bracket 302. The spherical ends have diameters that are larger than the width of each guide slot 306.

Notches 310 extend within the edge of the bracket 302, one for each column/ball assembly 300. An arcuate slot 312 adjoins each notch. The width of each slot 312 is smaller than the diameter of the ball portion of each column/ball assembly. A lever 314 is attached to the bracket for rotating the bracket about a vertical axis. The lever is shown in the "open" position in FIG. 29. In this position, the cover (not shown) is not latched to the brewing chamber housing and can be rotated about a hinge (not shown) to provide access to the brewing chamber in a similar manner to that shown in FIG. 14. When the cover is closed and the lever 314 is used to rotate the bracket 302 to the closed position, the columns enter the slots 312 while the spherical ends thereof press down on the upper surface of the bracket 302, forcing it and the cover downwardly. A seal (not shown) is provided between the water distributor plate (not shown) affixed to the bracket 302 and the upper surface of the basket 144 or 146 (not shown in FIG. 29) in this manner. The cover is also effectively latched when in this position.

It will be appreciated that the above description relates to preferred embodiments of the invention, and is not to be considered as limiting the invention to the specific structure and method of operation disclosed.

What is claimed is:

1. A hot beverage maker comprising:
   a housing for a brewing chamber;
   a cover positionable on the housing for closing the brewing chamber;
   a water inlet in the cover;
   a water reservoir;
   a pump in fluid communication with the water reservoir and the water inlet;
   a heater for heating water prior to its entering the water inlet;
   a sealing assembly movably mounted to the cover such that it is movable between up and down positions with respect to the cover; the sealing assembly including a side surface and an O-ring seal mounted in adjoining relation to the side surface, the O-ring seal being in a substantially horizontal position when the cover closes the brewing chamber; and
   a latching assembly for latching the cover to the housing for the brewing chamber,
   wherein the sealing assembly comprises a water inlet bracket positioned at least partially within the cover, the O-ring seal being mounted to the water inlet bracket, an actuating member extending through the cover for pushing the bracket downwardly, and a release member extending through the cover for releasing the latching assembly.

2. A hot beverage maker as described in claim 1 wherein the latching assembly includes a locking element mounted to the cover and movable between inner and outer positions, a complementary locking member mounted to the housing for the brewing chamber, the locking element being movable into locking engagement with the locking member only when the sealing assembly is in the down position and the cover is positioned on the housing for the brewing chamber.

3. A hot beverage maker as described in claim 2 including a first vertically movable actuating member mounted to the cover for urging the sealing assembly downwardly with respect to the cover and a second vertically movable actuating member mounted to the cover for retracting the locking element.

4. A hot beverage maker as described in claim 3 including means for resiliently urging the locking element outwardly with respect to the cover.

5. A hot beverage maker as described in claim 3 wherein the second actuating member is vertically movable with respect to the first actuating member.

6. A hot beverage maker as described in claim 1 wherein the latching assembly includes a pin movable within the cover and a pin receiving member secured to the housing, the release member being operatively associated with the pin for retracting the pin from the pin receiving member when pressed by a user.

7. A hot beverage maker as described in claim 1 including a basket mounted to the housing and extending within the brewing chamber, the basket including a substantially vertical inner surface that is engageable with the O-ring when the sealing assembly is in the down position.

8. A hot beverage make as described in claim 7 wherein the sealing assembly comprises a water inlet bracket positioned at least partially within the cover, the O-ring seal being mounted to the water inlet bracket, an actuating member extending through the cover for pushing the bracket downwardly, and a release member extending through the cover for releasing the latching assembly.

9. A hot beverage maker comprising:
   a housing for a brewing chamber;
   a cover assembly positionable on the housing for closing the brewing chamber, the cover assembly including a sealing assembly;
   a water inlet in the cover;
   a water reservoir;
   a pump in fluid communication with the water reservoir and the water inlet;
   a heater for heating water prior to its entering the water inlet;
   an axle extending at least partially across and the cover assembly;
   a hook mounted to the axle, wherein the hook and axle are rotatably about an axle axis with respect to the cover assembly; and
   a hook engagement member mounted to the housing for the brewing chamber, the hook engagement member being positioned and configured to allow at least a portion of the hook to extend beneath and engage a lower surface of the hook engagement member as the hook is downwardly rotated with respect to the cover assembly, wherein the sealing assembly includes a bracket, an annular seal coupled to the bracket, the hook being pivotably coupled to the bracket, and a lid cover enclosing said bracket.

10. A hot beverage maker as described in claim 9 wherein the cover assembly includes a lever for rotating the hook.

* * * * *